United States Patent

Maeda

[11] Patent Number: 5,576,960
[45] Date of Patent: Nov. 19, 1996

[54] DRIVING FORCE CONTROLLING APPARATUS FOR VEHICLE

[75] Inventor: Shinichi Maeda, Saitama, Japan

[73] Assignee: Honda Giken Kogyo Kabushiki Kaisha, Tokyo, Japan

[21] Appl. No.: 426,945

[22] Filed: Apr. 21, 1995

Related U.S. Application Data

[62] Division of Ser. No. 962,510, Oct. 16, 1992, Pat. No. 5,519,616.

[30] Foreign Application Priority Data

Oct. 25, 1991 [JP] Japan .................................. 3-306498
Oct. 25, 1991 [JP] Japan .................................. 3-306501

[51] Int. Cl.$^6$ ...................................................... G06F 7/70
[52] U.S. Cl. ................................ 364/426.01; 364/426.02; 364/426.03; 364/424.03; 303/148; 303/158; 303/173; 180/197; 180/249; 324/161; 324/166
[58] Field of Search ........................... 364/424.01, 424.03, 364/426.01, 426.02, 426.03, 565, 552; 303/183, 158, 168, 191, 173, 141, 127, 171, 139, 169, 148; 180/197, 233, 249; 324/161, 422, 166, 170

[56] References Cited

U.S. PATENT DOCUMENTS

| | | | |
|---|---|---|---|
| 4,113,322 | 9/1978 | Rhunau et al. ...................... | 303/168 |
| 4,219,244 | 8/1980 | Griner et al. ....................... | 303/168 |
| 4,420,814 | 12/1983 | Arkawa et al. ..................... | 364/565 |
| 4,722,576 | 2/1988 | Matsuda ............................... | 303/168 |
| 4,764,884 | 8/1988 | Noyori .................................. | 364/552 |
| 4,866,624 | 9/1989 | Nishikawa et al. ................ | 364/426.03 |
| 4,870,582 | 9/1989 | Horshi et al. ...................... | 364/426.02 |
| 4,947,325 | 8/1990 | Iwata et al. ......................... | 364/424.03 |
| 4,969,695 | 11/1990 | Maehata et al. ..................... | 324/166 |
| 5,132,908 | 7/1992 | Eto et al. ............................ | 364/426.02 |
| 5,201,383 | 4/1993 | Kitagawa et al. ................... | 364/426.03 |
| 5,219,212 | 6/1993 | Shimada et al. .................... | 364/426.01 |
| 5,225,982 | 6/1993 | Ito et al. ............................. | 364/426.03 |
| 5,241,478 | 8/1993 | Inoue et al. ......................... | 364/426.02 |
| 5,295,738 | 3/1994 | Matsuura et al. ................... | 303/158 |
| 5,429,428 | 7/1995 | Yasuda ................................. | 180/197 |

FOREIGN PATENT DOCUMENTS

| | | |
|---|---|---|
| 27301C2 | 8/1983 | Germany . |
| 37452A1 | 4/1987 | Germany . |
| 7200A1 | 5/1990 | Germany . |
| 25829A1 | 2/1991 | Germany . |
| 1170726 | 7/1989 | Japan . |

*Primary Examiner*—Kevin J. Teska
*Assistant Examiner*—Jacques Louis-Jacques

[57] ABSTRACT

To prevent a great variation of a detected wheel velocity for a period of time after a front wheel sensor or a rear wheel sensor for detection of a wheel velocity actually fails until a microcomputer detects the failure, it is determined whether or not an output pulse period of a front wheel sensor is equal to or shorter than a predetermined period. When the output pulse period exceeds the predetermined period, it is determined that there is the possibility that the front wheel sensor may be in failure, thus a front wheel velocity for a predetermined number of control cycles before (a front wheel velocity before the failure) is adopted as a front wheel velocity of the present control cycle. Also, a rear wheel velocity is calculated in a similar manner. For a time after a failure actually occurs until the failure is detected by a microcomputer, driving force control is not started even if other starting conditions for driving force control are satisfied.

20 Claims, 19 Drawing Sheets

DRIVING FORCE CONTROLLING APPARATUS FOR VEHICLE

This application is a divisional of application Ser. No. 07/962,510, filed on Oct. 16, 1992, U.S. Pat. No. 5,519,616, the entire contents of which are hereby incorporated by reference.

FIELD OF THE PRESENT INVENTION

The present invention relates to a driving force controlling apparatus for a vehicle, and particularly, to a driving force controlling apparatus for a vehicle wherein, when a vehicle wheel sensor for detecting a velocity of a wheel fails, the ignition time for driving force control is not varied to a great extent for a time after the failure actually occurs until the failure is detected by a microcomputer.

The present invention also relates to a driving force controlling apparatus for a vehicle wherein, when a vehicle wheel sensor for detecting a velocity of a wheel fails, the driving force control is not started after the failure actually occurs until the failure is detected by a microcomputer.

BACKGROUND OF THE PRESENT INVENTION

Various driving force controlling (so-called traction controlling) apparatuses for a vehicle which control an ignition time or an air/fuel ratio to prevent a slip of a wheel are conventional. For example, in Japanese Patent Laid-Open Application No. 1-170726, a technique is disclosed wherein a driving force is gradually returned to a standard condition when a front wheel sensor or a rear wheel sensor for detecting a front wheel velocity or a rear wheel velocity, which is necessary to detect a slip level of the vehicle, fails.

Since data of the front wheel velocity and the rear wheel velocity have some dispersion, the average values are calculated. The average values are then used for detection of a slip level described above.

Such a failure of a front wheel sensor or a rear wheel sensor as described above can be detected by a microcomputer which executes a predetermined failure determination process. Some time lag can exist after the sensor has actually failed until the microcomputer detects the failure.

Accordingly, even if a predetermined condition (driving force control starting condition) is satisfied and control is changed over from standard control to driving force control during the time lag mentioned above, there is the possibility that a signal (ignition time) for driving force control may be calculated using wheel velocity data different from an actual wheel velocity, which is not preferable. When the driven wheel velocity decreases and the driven wheel velocity is 0 or so, a slip is detected and output power control is performed, whereafter the failure is detected, and consequently, the control will enter a failure mode in the output power control.

SUMMARY OF THE PRESENT INVENTION

It is an object of the present invention to provide a driving force controlling apparatus for a vehicle which does not execute driving force control even if other starting conditions for driving force control are satisfied after a front wheel sensor or a rear wheel sensor has failed until a microcomputer actually detects the failure.

According to the present invention, a driving force controlling apparatus for a vehicle wherein a slip level (slip amount or slip ratio) of the vehicle is detected using a front wheel velocity (driven wheel velocity) and a rear wheel velocity (driving wheel velocity) of the vehicle and an ignition time for driving force control is set in accordance with the slip level is characterized in that, when the period of pulses outputted from a wheel velocity detecting sensor (front wheel sensor and/or rear wheel sensor) is not equal to or lower than a predetermined period, even if other conditions for driving force control are satisfied during running of the vehicle, starting of such driving force control is inhibited.

While the vehicle is running, when the period of pulses outputted from the wheel velocity detecting sensor is not equal to or lower than the predetermined period, it can be determined that the possibility of failure of the sensor is high without relying upon a failure determination process of the microcomputer. Accordingly, even if the other conditions for driving force control are satisfied, starting of the driving force control is inhibited.

It is another object of the present invention to provide a driving force controlling apparatus for a vehicle wherein a calculated wheel velocity is not different from an actual wheel velocity for a time after a front wheel sensor or a rear wheel sensor has failed until a microcomputer actually detects the failure.

According to the present invention, a driving force controlling apparatus for a vehicle wherein a slip level (slip amount or slip ratio) of the vehicle is detected using average values of a front wheel velocity (driven wheel velocity) and a rear wheel velocity (driving wheel velocity) of the vehicle and an ignition time for driving force control is set in accordance with the slip level is characterized in that it is determined whether or not the period of pulses outputted from a sensor for detection of a wheel velocity is equal to or lower than a predetermined period. When the predetermined period is exceeded, a wheel velocity of a control cycle, a predetermined number of control cycles before, is adopted as the calculated wheel velocity data in the present control cycle and an average value of the wheel velocity is calculated using the data.

When pulses outputted from the sensor for detection of a wheel velocity, that is, the front wheel sensor (driven wheel sensor) and/or the rear wheel sensor (driving wheel sensor) exceed the predetermined period described above, the possibility of failure of the sensor is high without relying upon the failure determination process of the microcomputer. Accordingly, the detected wheel velocity is not adopted, and wheel velocity data of a control cycle replaced the wheel velocity data of the present control cycle and an average value of the wheel velocity is calculated using the data.

In other words, when the possibility of failure of the front wheel sensor or the rear wheel sensor is high, an average value is calculated using a wheel velocity before the failure of the sensor until the microcomputer actually makes a failure determination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and advantages of the present invention will become more apparent from the detailed description of the preferred embodiments with reference to the accompanying drawings, which are given by way of illustration only and thus are not limitative of the present invention and wherein.

DETAILED DESCRIPTION OF THE PRESENT INVENTION

Figure 2:
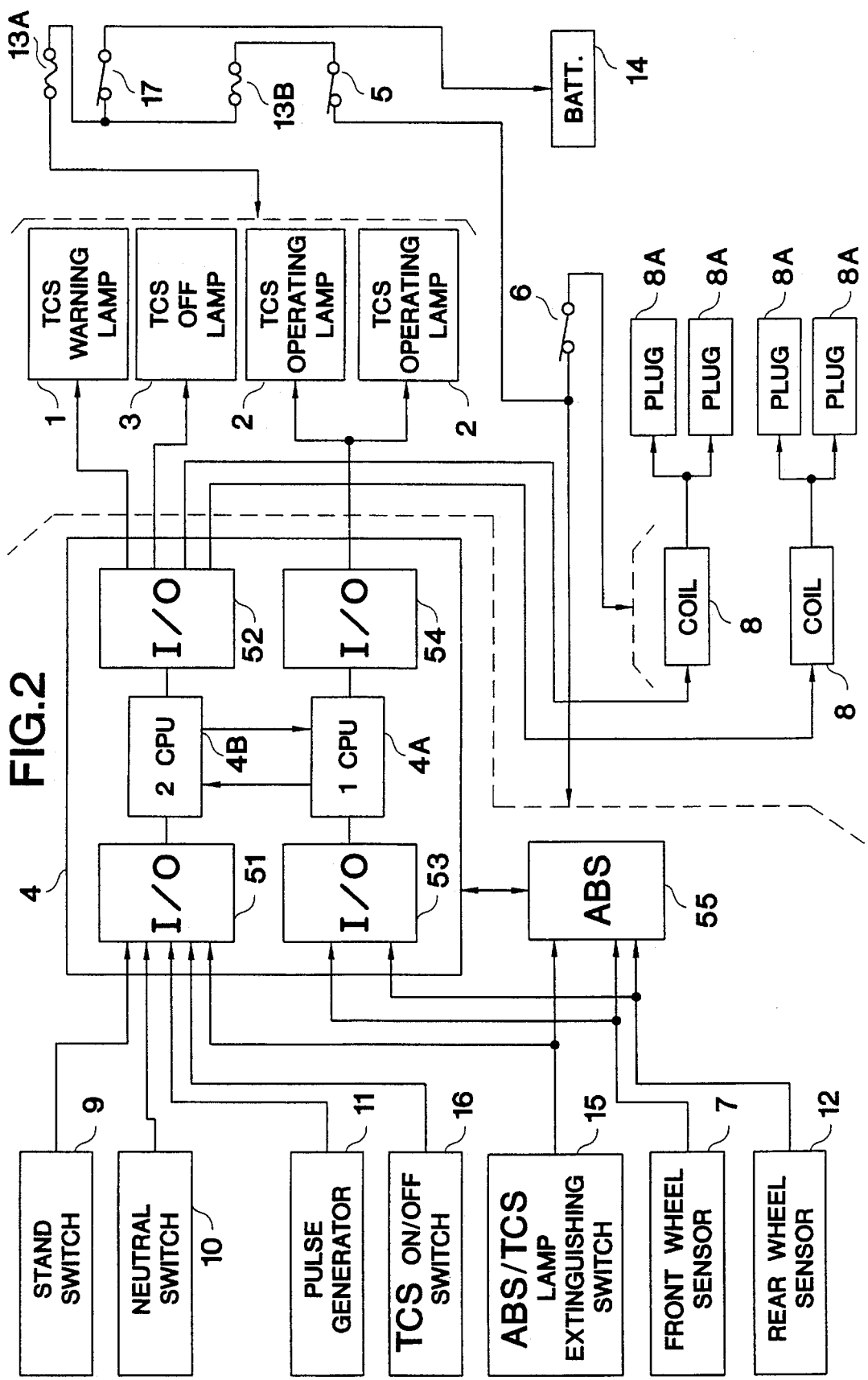
FIG. 2 is a block diagram of the present invention.

In the following, the present invention will be described in detail with reference to the drawings. FIG. 2 is a block diagram showing construction of the present invention. Referring to FIG. 2, reference numeral 4 denotes a unit for ignition control and driving force control, which is of the so-called dual CPU type which includes a first CPU 4A (for driving force control) and a second CPU 4B (for ignition control) as shown in FIG. 2. Each of the CPUs monitors the other CPU. The first CPU 4A and the second CPU 4B include interface circuits 53 and 54 as well as interface circuits 51 and 52, respectively, and each includes a ROM, a RAM (not shown) and so forth for constituting a microcomputer.

A side stand switch 9 for detecting whether or not a side stand is directed downwardly, a neutral switch 10 for detecting whether or not a transmission is in a neutral position, a pulse generator 11 which generates pulses for detecting an engine speed Ne of the vehicle and a TCS ON/OFF switch 16 for setting whether or not the driving force controlling system (TCS) should be put into an executable condition.

Further, an ABS/TCS warning lamp extinguishing switch 15, for instructing extinction of a TCS warning lamp 1 when the driving force controlling system fails so that the TCS warning lamp 1 is lit and for instructing extinction of an ABS warning lamp (reference numeral 41 of FIG. 5) when a brake controlling system (anti-locking brake system, ABS) fails so that the ABS warning lamp is lit, is connected to the interface circuit 51 and an ABS controlling unit 55.

A front wheel sensor 7 for detecting a rotational velocity of a front wheel (front wheel velocity, that is driven wheel velocity) and a rear wheel sensor 12 for detecting a rotational velocity of a rear wheel (rear wheel velocity, that is driving wheel velocity) are connected to the interface circuit 53 and the ABS controlling unit 55. The ABS controlling unit 55 does not have a direct relationship to the present invention, but controls a brake system (not shown) so as to prevent an increase of the slip level upon braking operation of the vehicle. The ABS controlling unit 55 executes delivery of predetermined data to and from the ignition/driving force controlling unit 4.

A TCS warning lamp 1 which is lit when the driving force controlling system is in a failed condition and a TCS OFF indicating lamp 3 which is lit when driving force control by the driving force controlling system is in a cancelled condition as well as ignition coils 8 are connected to the interface circuit 52. The ignition coils 8 are connected to ignition plugs 8A.

A TCS operation lamp 2 which is lit when driving force control by the driving force controlling system is being executed is connected to the interface circuit 54.

The components described above receive power from a battery 14. Particularly, the lamps 1 to 3, lamps 41 to 46 which will be described with reference to FIG. 5 receive power from the battery 14 by way of a main switch 17 and a fuse 13A. Meanwhile, the ignition coils 8 receive power from the battery 14 by way of the main switch 17 as well as another fuse 13B, an engine stop sensor relay 5 which operates upon detection of the falling down of the vehicle by an engine stop sensor 6, and the engine stop sensor 6. Further, the ignition/driving force controlling unit 4, the ABS controlling unit 55 and so forth receive power from the battery 14 from a junction between the engine stop sensor relay 5 and the engine stop sensor 6.

Figure 3:
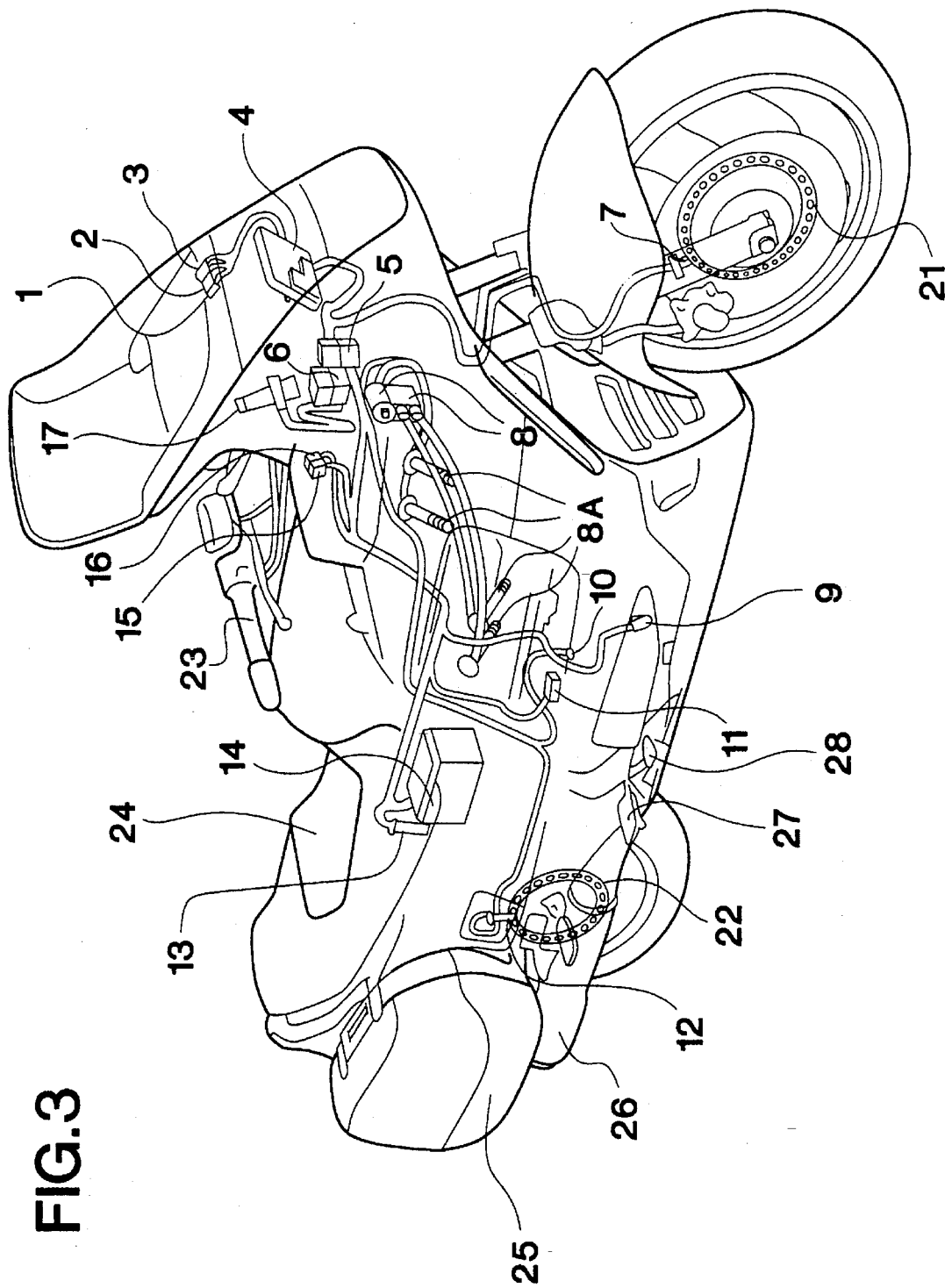
FIG. 3 illustrates an application of the present invention.
Figure 4:
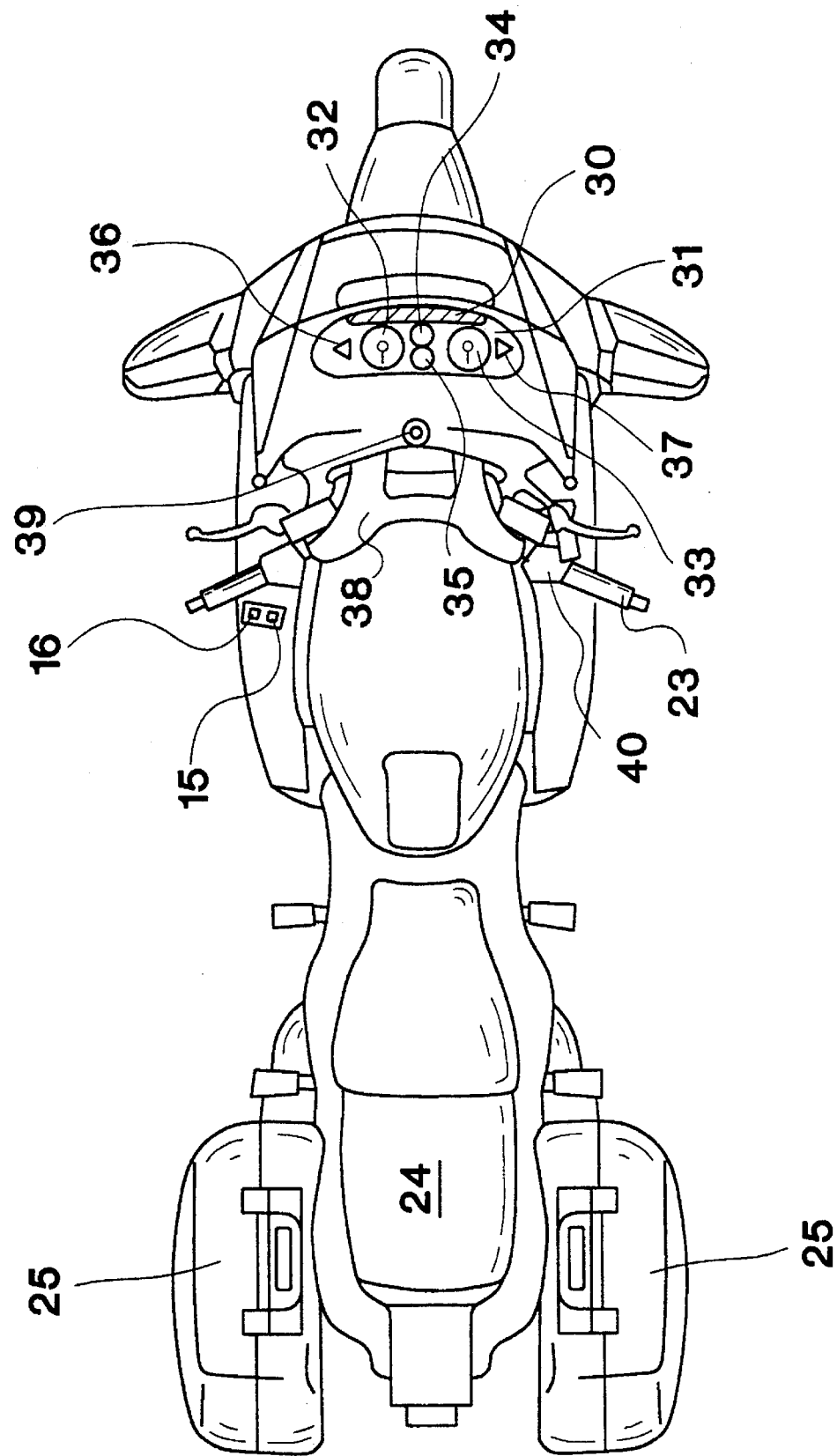
FIG. 4 is a top view of FIG. 3.

An example applicable to a motorbicycle will be described below. FIG. 3 illustrates a motorbicycle to which the present invention is applied, and FIG. 4 is a schematic of FIG. 3. Referring to FIGS. 3 and 4, since like reference numerals to those in FIG. 2 denote like or equivalent portions, description thereof is omitted herein. It is to be noted that a fuse box 13 accommodates the fuses 13A and 13B therein.

First, referring to FIG. 3, a front wheel pulser ring 21 and a rear wheel pulser ring 22 are constructed such that the rings are mounted on front and rear wheels, respectively, and each time the front wheel and the rear wheel rotate a predetermined angle, the front wheel sensor 7 and the rear wheel sensor 12 output a pulse. Reference numerals 23, 24, 25, 26, 27, and 28 denote a handgrip, a seat, a luggage box, a muffler, a step and a brake pedal, respectively.

Figure 5:
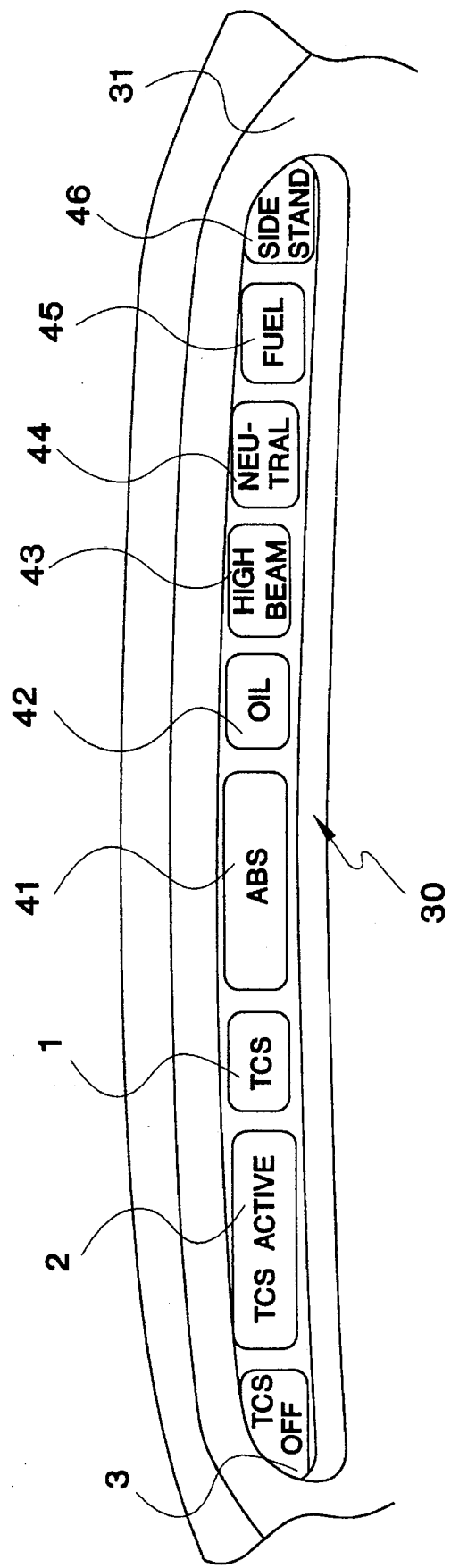
FIG. 5 is an enlarged view of an indicator panel.

Subsequently, referring to FIG. 4, reference numeral 31 denotes a meter panel, which includes a speedometer 32, a tachometer 33, a fuel meter 34, a water temperature meter 35, a turn lamp (left) 36 and a turn lamp (right) 37. An indicator panel 30 is mounted at a front portion of the meter panel 31. An enlarged view of the indicator panel 30 is shown in FIG. 5. In FIG. 5, like reference numerals to those of FIG. 2 denote like or equivalent portions.

Referring to FIG. 5, in addition to the TCS warning lamp 1, the TCS operation lamp 2 and the TCS OFF indicating lamp 3 described above, an ABS warning lamp 41 which is lit when the brake controlling system based on the ABS controlling unit 55 fails, an oil warning lamp 42 which indicates low oil, a high beam lamp 43 which indicates that the light distributing condition of the head lamp is high (high beam), a neutral lamp 44 which indicates that the transmission of the engine is in neutral, a fuel warning lamp 45 which indicates low fuel and a side stand lamp 46 which indicates that the side stand is directed downwardly are provided on the indicator panel 30.

Figure 6:
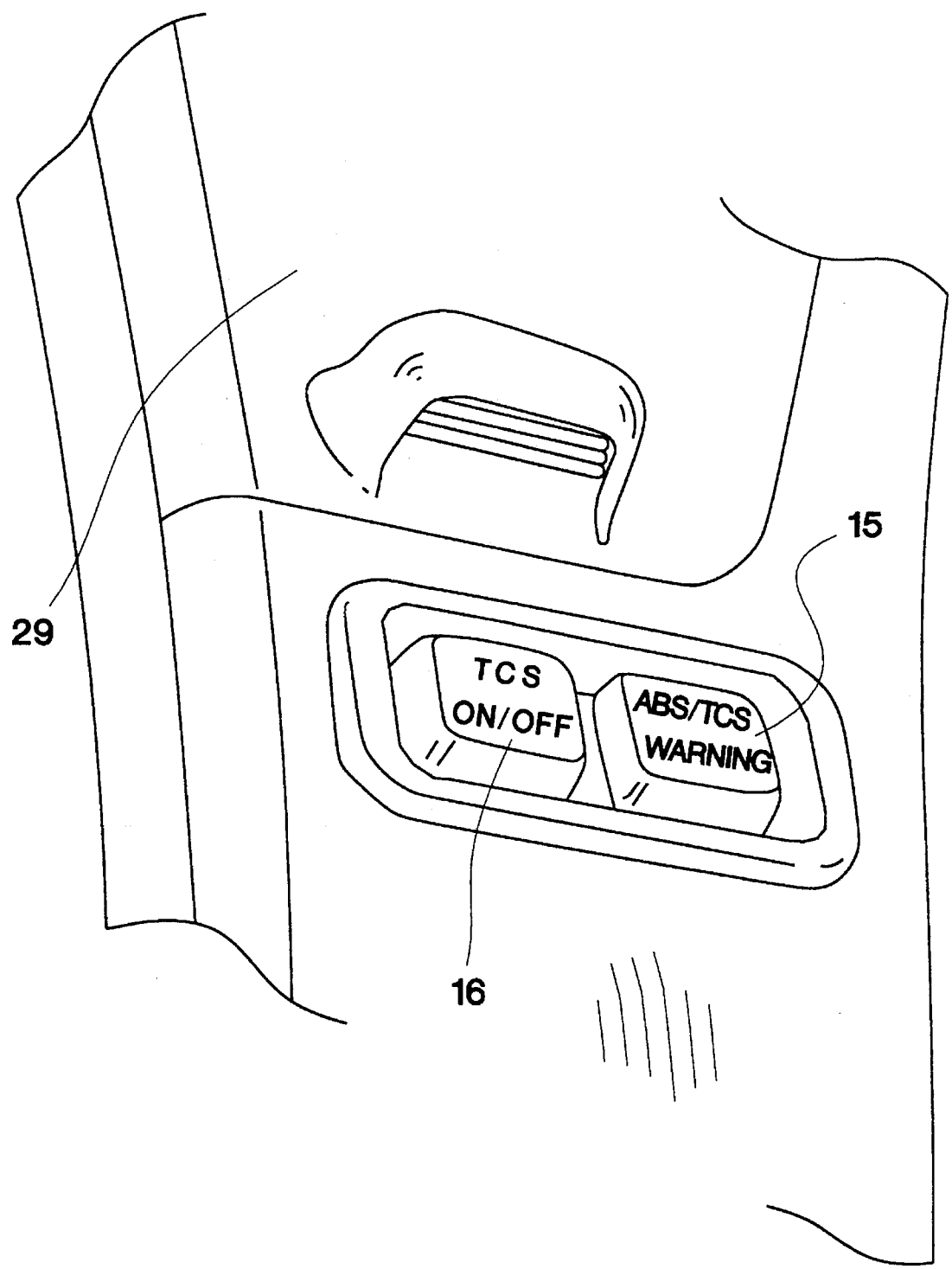
FIG. 6 is an enlarged view of an ABS/TCS warning lamp extinguishing switch, a TCS ON/OFF switch and associated parts of FIG. 4.

Referring back to FIG. 4, reference numerals 38, 39, and 40 denote a handgrip cover, a main switch hole and a switch case, respectively. An enlarged view of the ABS/TCS warning lamp extinguishing switch 15 and elements in the neighborhood of the TCS ON/OFF switch 16 of FIG. 4 is shown in FIG. 6. Referring to FIG. 6, reference numeral 29 denotes a glove compartment. The switches 15 and 16 are provided on a side panel.

Figure 7:
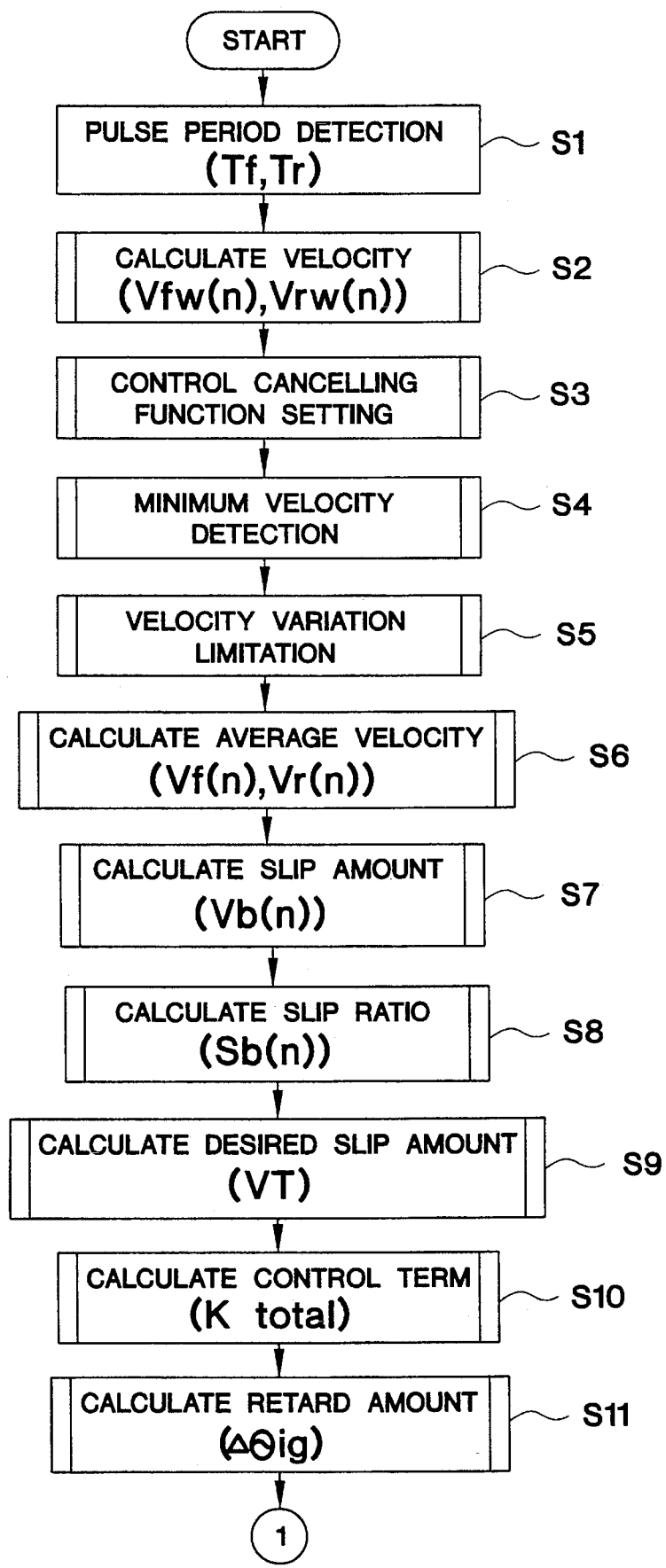
FIG. 7 is a flow chart showing a main routine of one embodiment of the present invention.
Figure 8:
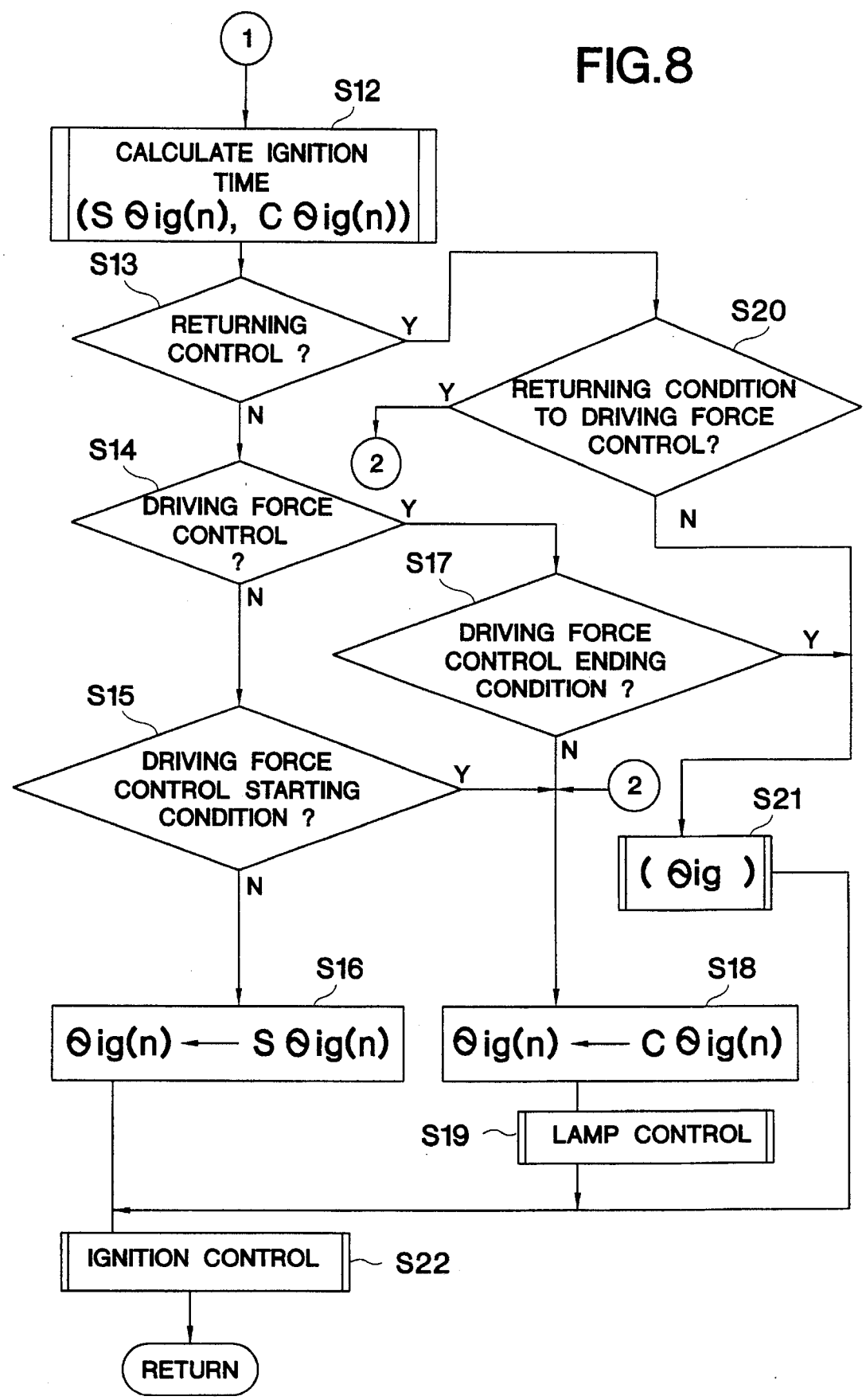
FIG. 8 is a flow chart showing a main routine of one embodiment of the present invention.

The operation of the present invention will now be described. FIGS. 7 and 8 are flowcharts illustrating a main routine of one embodiment of the present invention. The main routine is executed, for example, after a predetermined time. First at step S1, periods of pulses (rectangular waves) outputted from the front wheel sensor 7 and the rear wheel sensor 12 (FIGS. 2 and 3) are detected (measured) and represented by $T_f$ and $T_r$, respectively.

At step S2, a front wheel velocity $V_{fw}(n)$ and a rear wheel velocity $V_{rw}(n)$ are calculated using the periods $T_f$ and $T_r$. The calculations are executed using a first equation and a second equation.

$$V_{fw}(n) = K_f / T_f \quad (1)$$

$$V_{rw}(n) = K_r / T_r \quad (2)$$

Here, $K_f$ and $K_r$ are predetermined constants.

Subsequently at step S3, it is determined whether or not cancellation of the function of driving force control by operation of the TCS ON/OFF switch 16 (FIG. 2) is effective. An example of such a process is shown in FIG. 9.

Figure 9:
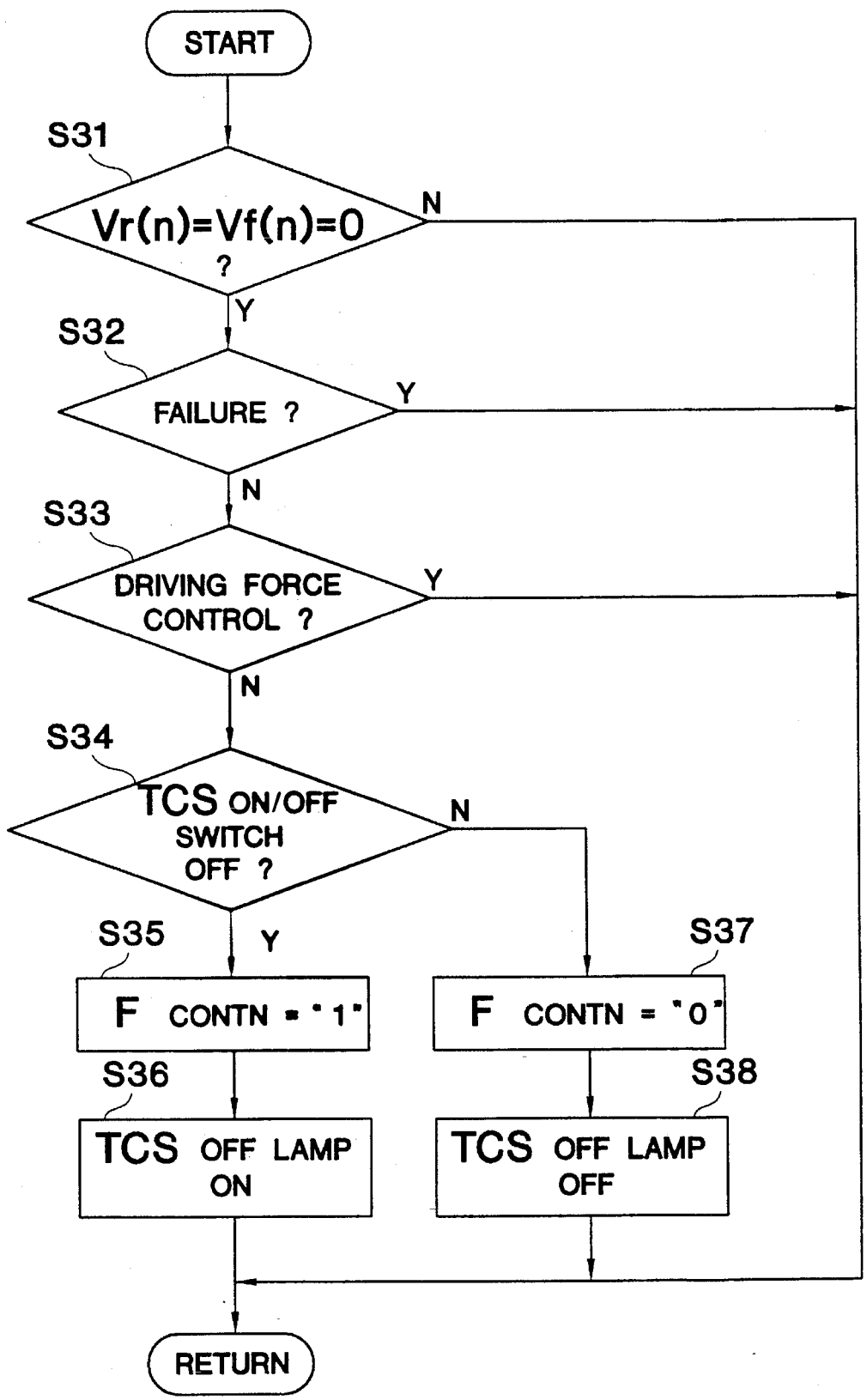
FIG. 9 is a subroutine showing an example of the process at step S3.

Referring to FIG. 9, first at step S31, it is determined whether or not both an average front wheel velocity $V_f(n)$ and an average rear wheel velocity $V_r(n)$ which will be described in connection with step S6 (FIG. 7) are equal to 0. If the values are not equal to 0 (that is, if the vehicle is running), then the process comes to an end. On the contrary if the values are equal to 0, then the process advances to step S32. It is to be noted that it may be determined whether or not the front wheel velocity $V_{fw}(n)$ and the rear wheel velocity $V_{rw}(n)$ calculated at step S2 are equal to 0.

At step S32, it is determined whether or not the driving force controlling system or the first CPU 4A for driving force control is in a failure mode. Such a failure determination will be described.

If the driving force controlling system is not in a failure mode, it is determined at step S33 whether or not driving force control is being executed at present. In other words, whether or not $C\theta_{ig}(n)$ which will be described is adopted as an ignition time. If driving force control is not being executed, it is determined at step S34 whether or not cancellation of driving force control is designated (the switch 16 is OFF) by operation of the TCS ON/OFF switch 16. If cancellation is designated, a control inhibition flag $F_{conin}$ is set to "1" at step S35. Then at step S36, the TCS OFF indicating lamp 3 is lit, whereafter the process comes to an end.

If a condition wherein cancellation of driving force control is not designated by operation of the TCS ON/OFF switch 16 (the switch 16 is ON) is determined at step S34 described above, the control inhibition flag $F_{conin}$ is set to "0" at step S37, and the TCS OFF indicating lamp 3 is extinguished at step S38, whereafter the process comes to an end.

It is to be noted that the TCS ON/OFF switch 16 is in an ON-state at a point of time when the main switch 17 (FIG. 2) is closed.

Referring back to FIG. 7, at step S4, it is determined whether or not the front wheel velocity $V_{fw}(n)$ or the rear wheel velocity $V_{rw}(n)$ exceeds a predetermined threshold value, and in case one of the values exceeds, the velocity is modified. An example of the process is shown in FIG. 10.

Figure 10:
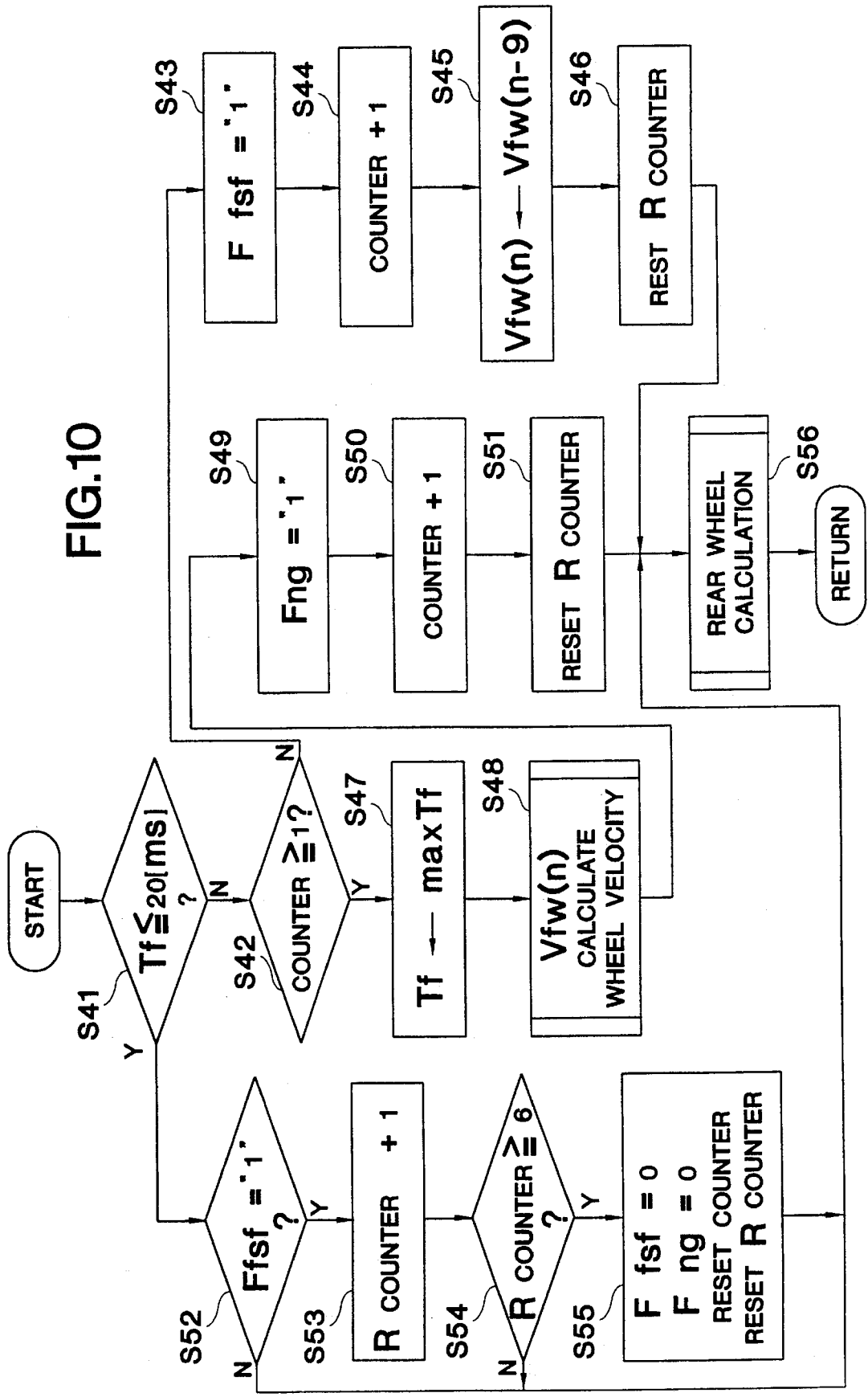
FIG. 10 is a subroutine showing an example of the process at step S4.

Referring to FIG. 10, first at step S41, it is determined whether or not the output pulse period $T_f$ of the front wheel sensor 7 is equal to or lower than a predetermined period (for example, 20 ms). If 20 ms is exceeded, it is determined whether or not a count value of a predetermined counter is equal to or greater than 1. Since the counter is reset when power is applied to the driving force controlling system, when the processing at step S42 is executed for the first time, the process then advances to step S43.

At step S43, it is determined that there is the possibility that the front wheel sensor 7 may be in failure, and a front wheel failure flag $F_{fsf}$ is set to "1". At step S44, the counter is incremented by one. A failure determined using the flag $F_{fsfs}$ f will be described.

At step S45, the value of the front wheel velocity $V_{fw}(n)$ set at step S2 as described above is cancelled and a front wheel velocity calculated nine control cycles before, that is, $V_{fw}(n-9)$, is set as the front wheel velocity $V_{fw}(n)$ in the present control cycle. At step S46, an R counter which will be described in connection with step S51 is reset.

When the front wheel failure flag $F_{fsf}$ is equal to "1" as described above, that is, when the output pulse period $T_f$ of the front wheel sensor 7 exceeds the predetermined period (20 ms), this is not an ordinary running condition and the possibility is high that the front wheel sensor 7 has failed. In this instance, since the output of the front wheel sensor 7 is not accurate, $V_{fw}(n-9)$ is adopted as the front wheel velocity $V_{fw}(n)$ (step S45) so that an average front wheel velocity $V_f(n)$ may be calculated at step S6 which will be described using data before the failure of the front wheel sensor 7.

In case the process advances from step S41 to step S42 continuously two or more times, the process subsequently advances from step S42 to step S47. At step S47, the period $T_f$ is reset to a preset predetermined period maxT_f (for example, 65 ms). At step S48, the front wheel velocity $V_{fw}(n)$ is calculated again using the re-set period $T_f$.

At step S49, a flag $F_{ng}$ is set to "1", and at step S50, the counter described above is incremented by one. At step S51, the R counter is reset.

If it is determined at step S41 described above that the output pulse period $T_f$ of the front wheel sensor 7 is equal to or lower than 20 ms, it is determined at step S52 whether or not the front wheel failure flag $F_{fsf}$ is equal to "1". If the front wheel failure flag $F_{fsf}$ is equal to "1", the R counter is incremented by one at step S53. The R counter is reset also when power is applied to the driving force controlling system.

At step S54, it is determined whether or not the count value of the R counter is equal to 6. In case the count value is equal to 6 (that is, in case it is determined, after it is determined once that $T_f$ exceeds 20 ms, successively by 6 times that $T_f$ is lower than 20 ms), the front wheel failure flag $F_{fsf}$ and the flag $F_{ng}$ are set to "0" and the counter described above and the R counter are reset at step S55.

After execution of steps S46, S51, or S55 described above or after a negative determination is made at step S52 or S54, the process advances to step S56, at which a similar process is executed also for the period $T_r$ of the rear wheel side. It is to be noted that a flag of the rear wheel side corresponding to the front wheel failure flag $F_{fsf}$ is a rear wheel failure flag $F_{fsr}$, and a period corresponding to the predetermined period max$T_f$ is max$T_r$.

Further, in case the flag $F_{ng}$ of one of the front wheel side and the rear wheel side is equal to "1", when the other wheel velocity $V_{fw}(n)$ or $V_{rw}(n)$ is to be set to $V_{rw}(n-9)$ or $V_{fw}(n-9)$, it is set to the predetermined period max$T_r$ or max$T_f$ instead of such setting.

Referring back to FIG. 7, at step S5, limitation to velocity variations of the front wheel velocity $V_{fw}(n)$ and the rear wheel velocity $V_{rw}(n)$ is executed. An example of the process is shown in FIG. 11.

Figure 11:
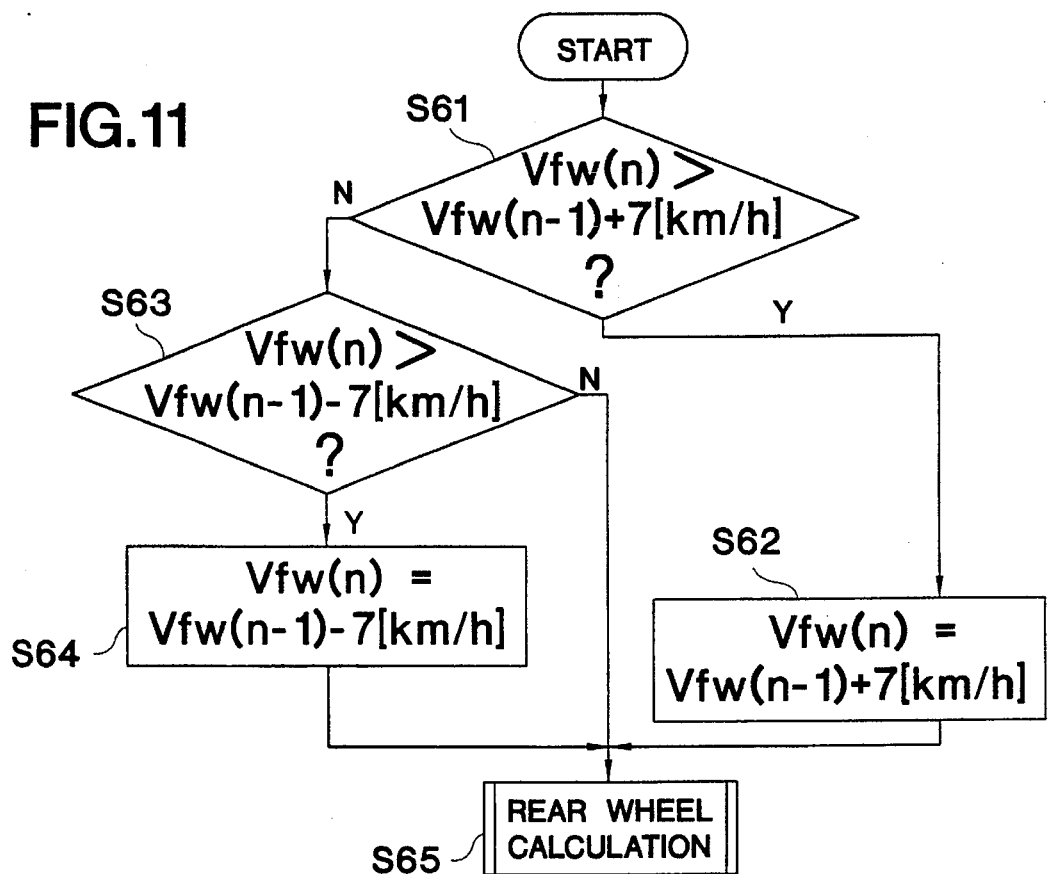
FIG. 11 is a subroutine showing an example of the process at step S5.

Referring to FIG. 11, at step S61, it is determined whether or not the front wheel velocity $V_{fw}(n)$ exceeds a velocity obtained by addition of a predetermined velocity (for example, 7 km/h) to a front wheel velocity calculated in the last control cycle (that is, $V_{fw}(n-1)$), and if the former exceeds, the front wheel velocity $V_{fw}(n)$ is reset at step S62 to the velocity described above ($V_{fw}(n-1)+7$ km/h).

In case of a negative determination at step S61, it is determined at step S63 whether or not the front wheel velocity $V_{fw}(n)$ is lower than a velocity obtained by subtraction of a predetermined velocity (for example, 7 km/h) from the front wheel velocity $V_{fw}(n-1)$ calculated in the last control cycle. If the former is lower, the front wheel velocity $V_{fw}(n)$ is reset at step S64 to the velocity described above ($V_{fw}(n-1)-7$ km/h).

After the process at step S62 or S64 or after the negative determination at step S63, the process advances to step S65, at which a similar process is executed also for the rear wheel velocity $V_{rw}(n)$.

Figure 12:
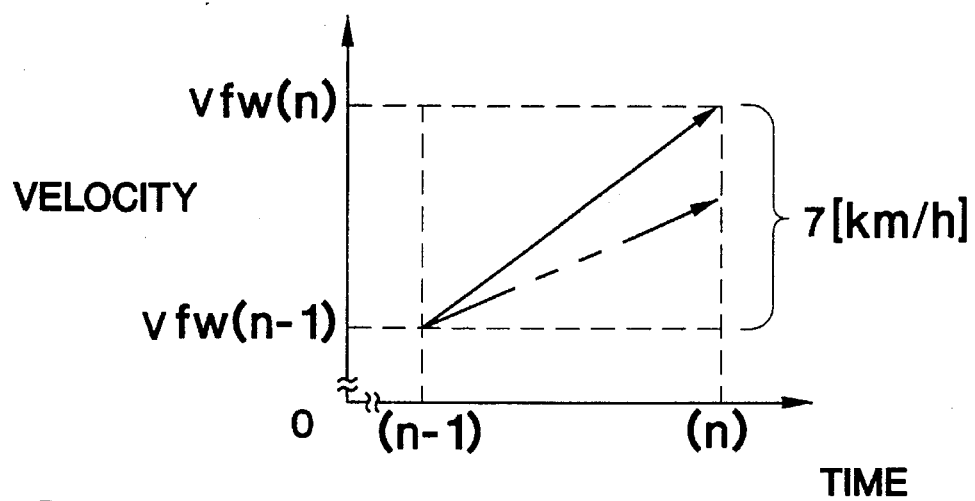
FIG. 12 is a graph showing a change of a front wheel velocity $V_{fw}(n)$.

FIG. 12 is a graph showing a manner of change of the front wheel velocity $V_{fw}(n)$. Referring to FIG. 12, the abscissa represents time and the ordinate represents a front wheel velocity. In FIG. 12, an arrow mark indicated by alternate long and two short dashes line represents a maximum wheel velocity change estimated upon running on a road having a low coefficient of friction at an execution interval (hereinafter referred to as "B/G interval") of the main routine shown in FIGS. 7 and 8. As apparently seen from FIG. 12, the value of 7 km/h indicated at the individual steps of FIG. 11 is a value which exceeds the maximum wheel velocity change mentioned above. It is to be noted that, when the maximum wheel velocity change exceeds 7 km/h, naturally the values indicated at the individual steps of FIG. 11 are modified to values exceeding the same.

Referring back to FIG. 7, at step S6, average wheel velocities (an average front wheel velocity Vf(n) and an average rear wheel velocity $V_r(n)$) which are average values of the front wheel velocity and the rear wheel velocity are calculated. An example of the process is shown in FIG. 13.

Figure 13:
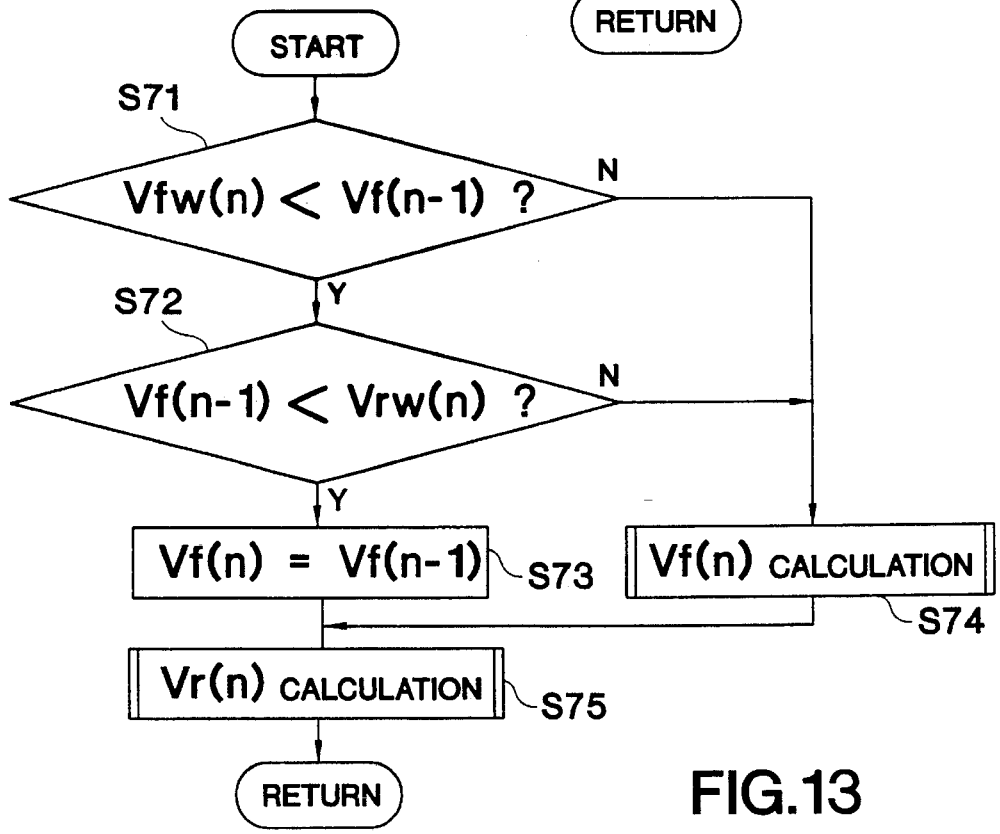
FIG. 13 is a subroutine showing an example of the process at step S6.

Referring to FIG. 13, at step S71, it is determined whether or not the front wheel velocity $V_{fw}(n)$ is lower than $V_f(n-1)$ (an average front wheel velocity $V_{fw}(n)$ calculated at the last control cycle). If the former is not lower, an average front wheel velocity $V_{fw}(n)$ is calculated in accordance with a third equation.

$$V_f(n)=(V_{fw}(n)+V_{fw}(n-1)+V_{fw}(n-2)+ \ldots +V_{fw}(n-m+1))/m \quad (3)$$

Since (n) represents a value of calculation in the present control cycle, the value $V_f(n)$ is a moving average value. It is to be noted that m is a positive integral number. Since $V_{fw}(n-9)$ is set as $V_{fw}(n)$ at step S45 of FIG. 10, m=10 in this instance.

If an affirmative determination is made at step S71 described above, it is determined at step S72 whether or not an average front wheel velocity $V_f(n-1)$ calculated in the last control cycle is lower than the rear wheel velocity $V_{fw}(n)$. If the former is lower, the average front wheel velocity $V_f(n-1)$ of the last control cycle is set at step S73 as the average front wheel velocity $V_f(n)$ of the present control cycle. In other words, the average front wheel velocity $V_f(n)$ is maintained at the value of the last control cycle. On the contrary if the average front wheel velocity $V_f(n-1)$ is not lower, the control process advances to step S74.

At step S75, an average rear wheel velocity $V_r(n)$ is calculated in accordance with a similar equation to the third equation.

In this manner, when a predetermined condition is satisfied only upon calculation of an average front wheel velocity $V_f(n)$, the average front wheel velocity $V_f(n)$ is maintained at a value obtained in the last control cycle.

Figure 14:
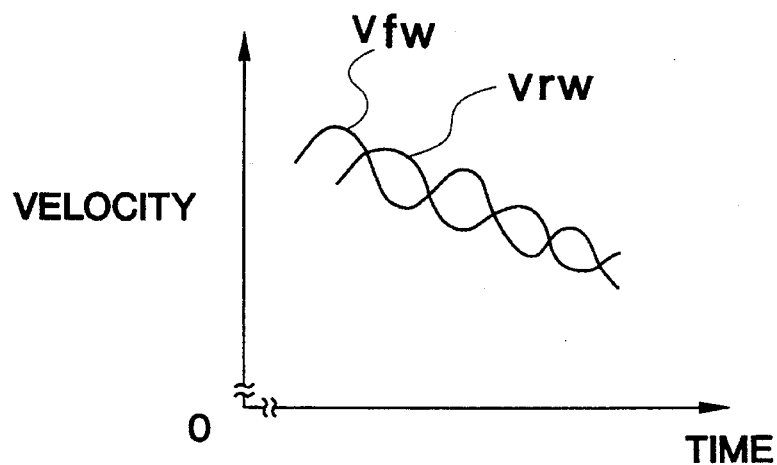
FIG. 14 is a graph showing an example of change of a front wheel velocity $V_{fw}$ ($V_{fw}(n)$) and a rear wheel velocity $V_{rw}$ ($V_{rw}(n)$) when a vehicle is braked suddenly.

FIG. 14 is a graph showing an example of manner of changes of the front wheel velocity $V_{fw}$ ($V_{fw}(n)$) and the rear wheel velocity $V_{rw}$ ($V_{rw}(n)$) when the vehicle is braked suddenly. As shown in FIG. 14, upon braking, it sometimes occurs that the relationship in magnitude between the front wheel velocity $V_{fw}$ and the rear wheel velocity $V_{rw}$ changes alternately as time passes when the vehicle is executing ABS control.

Figure 15:
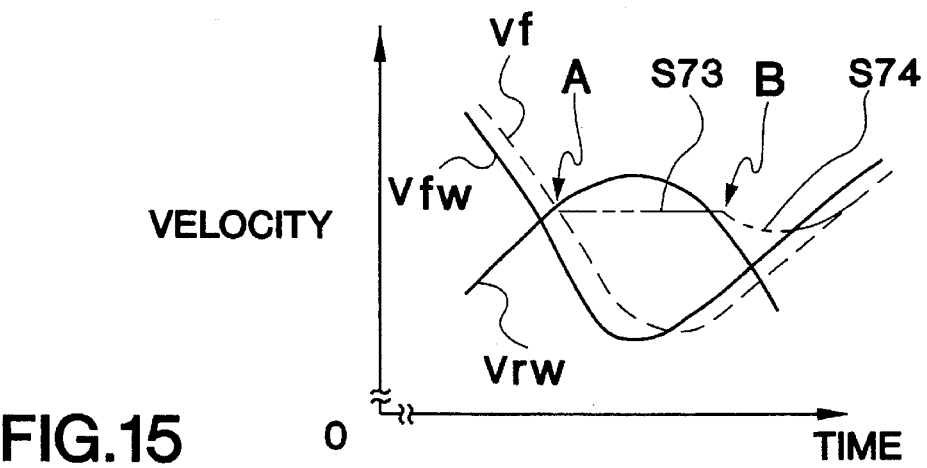
FIG. 15 is an enlarged view of FIG. 14.

In such braked condition, when the front wheel velocity $V_{fw}<$ rear wheel velocity $V_{rw}$, apparently an accelerated slipping condition is entered and driving force control is started. Accordingly, as shown in FIG. 15, when the front wheel velocity $V_{fw}(n)$ is lower than the average front wheel velocity $V_f(n-1)$ of the last control cycle (step S71) and the average front wheel velocity $V_f(n-1)$ of the last control cycle is lower than the rear wheel velocity $V_{rw}(n)$ (step S72), the average front wheel velocity $V_f(n)$ is maintained at the value (alternate long and two short dashes line in the same figure), and if the case described above is not satisfied, an average front wheel velocity $V_f(n)$ is calculated (step S74) using the third equation.

It is to be noted that, as described above, such a condition determination is not applied to calculation of an average rear wheel velocity $V_r(n)$.

Referring back to FIG. 7, at step S7, a slip amount $V_b(n)$ of the vehicle is calculated using a fourth equation.

$$V_b(n)=V_r(n)-V_f(n) \quad (4)$$

At step S8, a slip ratio $S_b(n)$ of the vehicle is calculated using a fifth equation.

$$S_b(n)=V_b(n)/V_r(n) \quad (5)$$

As a result, the slip ratio $S_b(n)$ is calculated within the range of 0 to 1.

Figure 16:
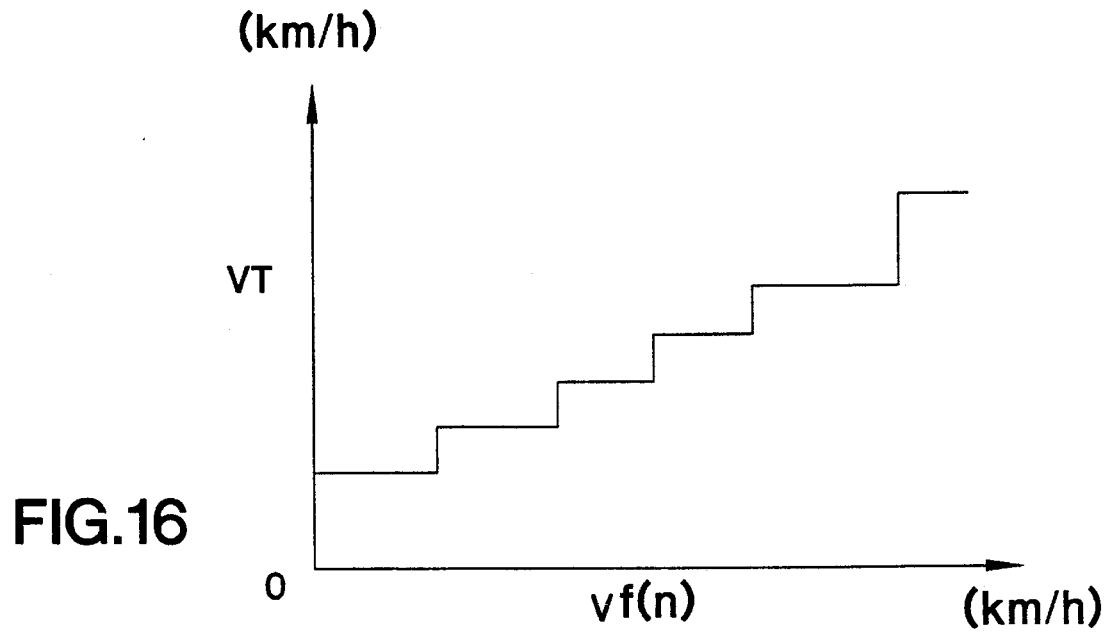
FIG. 16 is a graph for setting slip amount $V_T$.

At step S9, a desired slip amount $V_T$ is searched for from the average front wheel velocity $V_f(n)$ using a graph or table as shown in FIG. 16.

If the slip amount $V_b(n)$ and the slip amount $V_T$ are determined at steps S7 and S9 described above, PID control terms are calculated by an interrupt process other than the main routine using such $V_b(n)$ and $V_T$. An example of the interrupt process is shown in FIG. 17.

Figure 17:
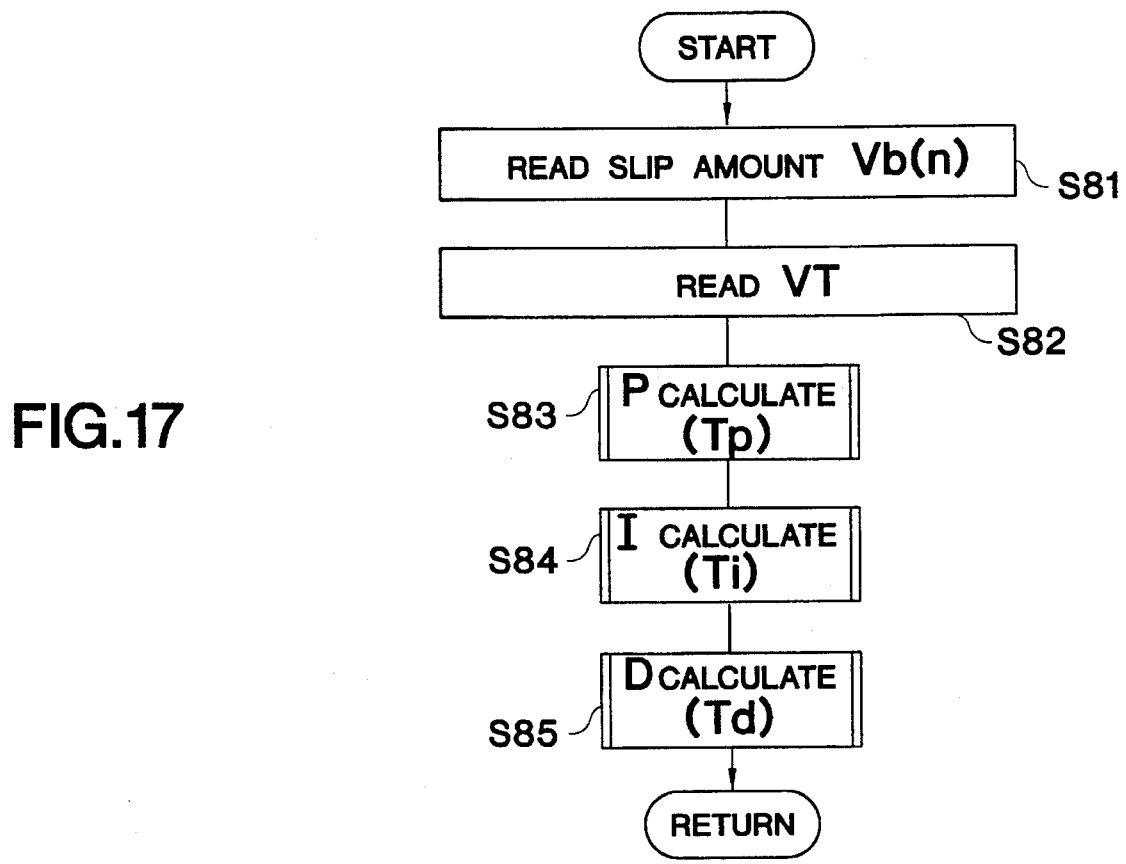
FIG. 17 is a flow chart showing an example of an interrupt process for calculation of PID control terms.

Referring to FIG. 17, first at steps S81 and S82, the slip amount $V_b(n)$ and slip amount $V_T$ thus calculated are read in.

At steps S83 to S85, a proportional term (P term) $T_p$, an integral term (I term) $T_i$ and a differential term (D term) $T_d$ which are PID feedback control terms are calculated using sixth to eighth equations.

$$T_p=(V_b(n)-V_T) \times G_p = \Delta V(n) \times G_p \quad (6)$$

$$T_i=(\Delta V(n)+\Delta V(n-1)+\Delta V(n-2)+ \ldots +\Delta V(1)) \times G_i = dt \Sigma \Delta V(n) \times G_i \quad (7)$$

$$T_d=(\Delta V(n)-\Delta V(n-1)) \times G_d \quad (8)$$

Here, $G_p$, $G_i$ and $G_d$ are preset control gains, and $\Delta V(n)$ is a difference between the actual slip amount $V_b(n)$ and the slip amount $V_T$. Further, $dt \Sigma \Delta V(n)$ is a sum total of the values of $\Delta V(n)$ calculated in the process of the present control cycle from $\Delta V(n)$ calculated in the process of the first control cycle. Further, the control terms $T_p$, $T_i$ and $T_d$ as well as $K_{total}$ are not set to values exceeding respective predetermined maximum values.

Referring back to FIG. 7, at step S10, an accumulated value of the control terms described above is calculated in accordance with a ninth equation.

$$K_{total}=T_p+T_i+T_d \quad (9)$$

At step S11, a retard amount $\Delta\theta_{ig}$ (positive value) of an ignition time is set in response to the engine speed $N_e$ and the accumulated value $K_{total}$. Such setting is performed by reading out $\Delta\theta_{ig}$ from a $\Delta\theta_{ig}$ map which employs $N_e$ and $K_{total}$ as parameters.

Subsequently, referring to FIG. 8, first at step S12, a standard ignition time $S\theta_{ig}(n)$ and a driving force controlling ignition time $C\theta_{ig}(n)$ are calculated. An example of such a process is illustrated in FIG. 18.

Figure 18:
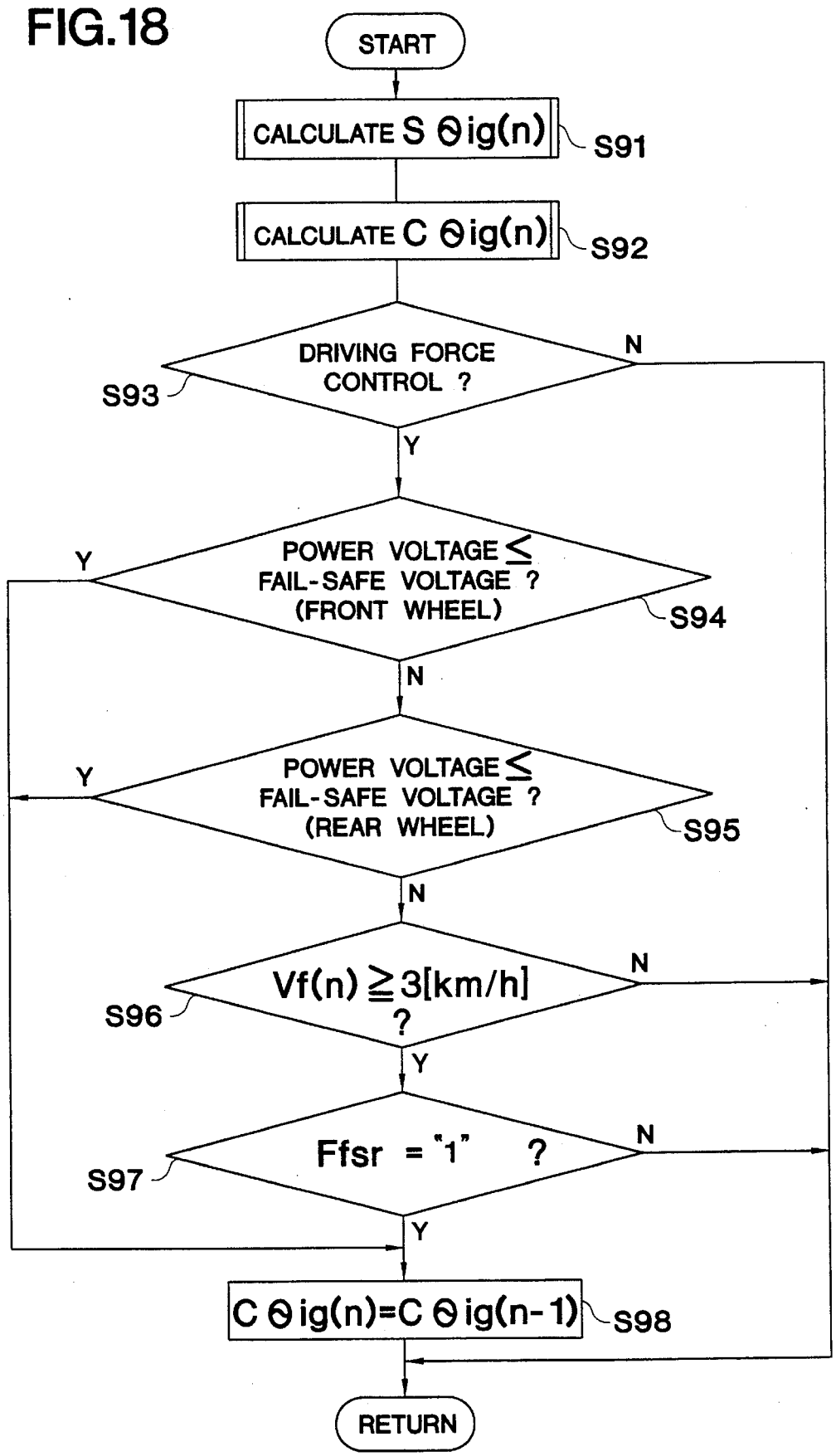
FIG. 18 is a subroutine showing an example of the process at step S12.

Referring to FIG. 18, first at step S91, a standard ignition time $S\theta_{ig}(n)$ is calculated from the engine speed $N_e$ using a known technique. At step S92, a driving force controlling ignition time $C\theta_{ig}(n)$ is calculated in accordance with a tenth equation using the value $S\theta_{ig}(n)$ described above and the retard amount $\Delta\theta_{ig}$.

$$C\theta_{ig}(n)=S\theta_{ig}(n)-\Delta\theta_{ig} \quad (10)$$

In this manner, $C\theta_{ig}$ is a value retarded by $\Delta\theta_{ig}$ from $S\theta_{ig}(n)$.

At step S93, it is determined whether or not driving force control is being executed at present, or in other words, whether or not $C\Delta_{ig}(n)$ is adopted as an ignition time. If driving force control is not being executed, the process comes to an end. On the contrary if driving force control is being executed, at steps S94 and S95, it is determined whether or not the power source voltage for the front wheel sensor 7 or the power source voltage for the rear wheel sensor 12 is lower than a predetermined voltage (fail-safe voltage). If at least one of the power source voltages is lower than the fail-safe voltage, the process advances to step S98.

On the other hand, if the power source voltages exceed the fail-safe voltage, the process advances to step S96.

At step S96, it is determined whether or not the average front wheel velocity $V_f(n)$ is equal to or higher than 3 km/h. If the average front wheel velocity $V_f(n)$ is lower than 3 km/h, the process comes to an end, but on the contrary if the average front wheel velocity $V_f(n)$ is higher than 3 km/h, it is determined at step S97 whether or not the rear wheel fail-safe flag $F_{fsr}$ is equal to "1". If $F_{fsr}$ is equal to "0", the process comes to an end, but if $F_{fsr}$ is equal to "1", the process advances to step S98.

At step S98, a value $C\theta_{ig}(n-1)$ calculated in the last control cycle is set as the driving force controlling ignition time $C\theta_{ig}(n)$. In other words, $C\theta_{ig}(n)$ is maintained at a value of the last control cycle. After then, the process comes to an end. In this manner, when the possibility that the front wheel sensor 7 or the rear wheel sensor 12 may be in failure is high during driving force control, the ignition time is maintained at a value of the last control cycle.

Referring back to FIG. 8, at step S13, it is determined whether or not returning control which will be described in connection with step S21 is being executed. If returning control is not being executed, it is determined at step S14 whether or not driving force control is being executed at present (whether or not $C\theta_{ig}(n)$ is adopted as an ignition time). If driving force control is not being executed, it is determined at step S15 whether or not starting conditions for driving force control are satisfied. If the conditions are not satisfied, the $S\theta_{ig}(n)$ is adopted as the ignition time $\theta_{ig}(n)$ at step S16. On the contrary if the conditions are satisfied, the driving force controlling ignition time $C\theta_{ig}(n)$ is adopted as $\theta_{ig}(n)$ at step S18.

Figure 19:
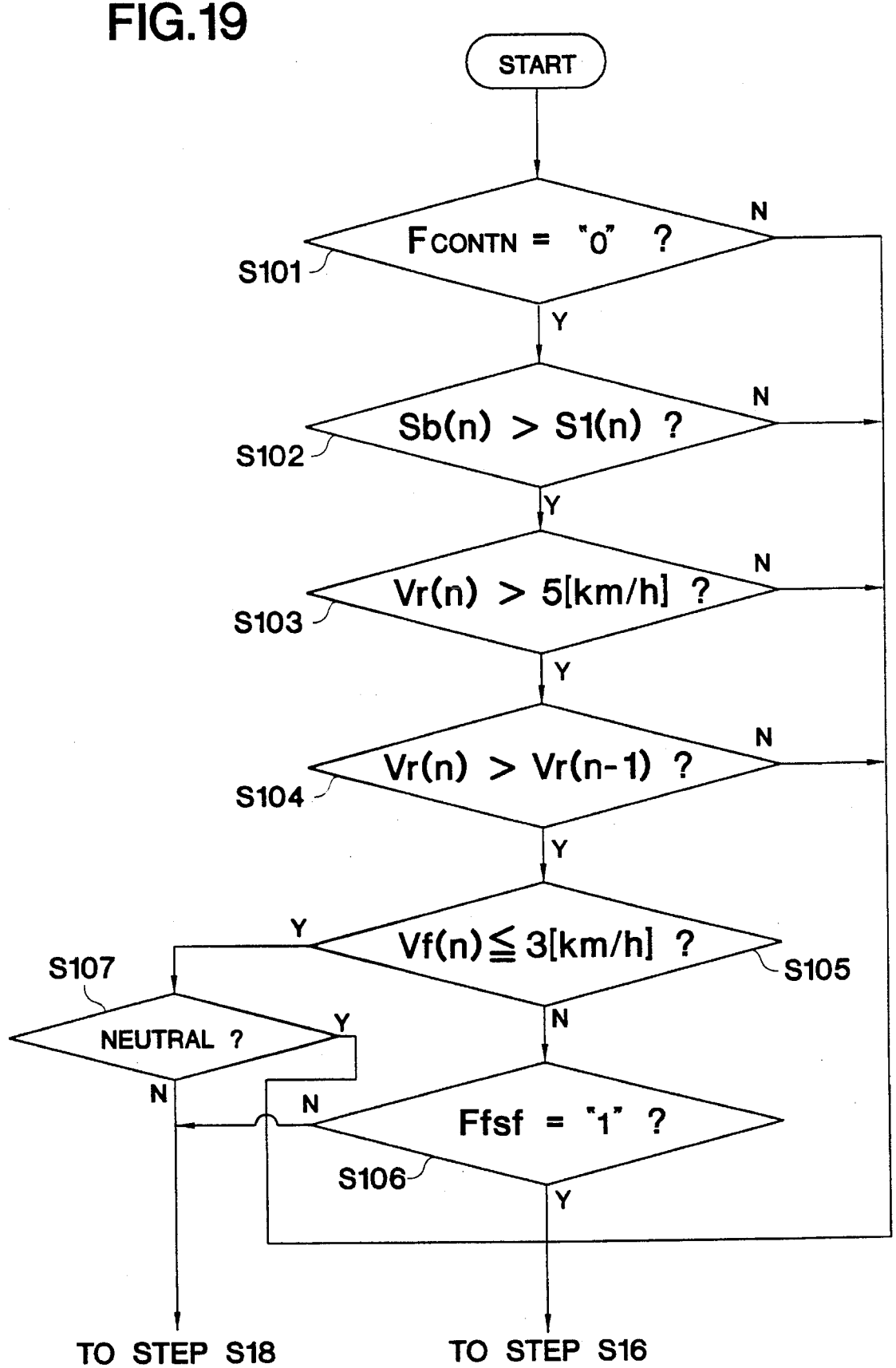
FIG. 19 is a subroutine showing an example of the process at step S15.
Figure 20:
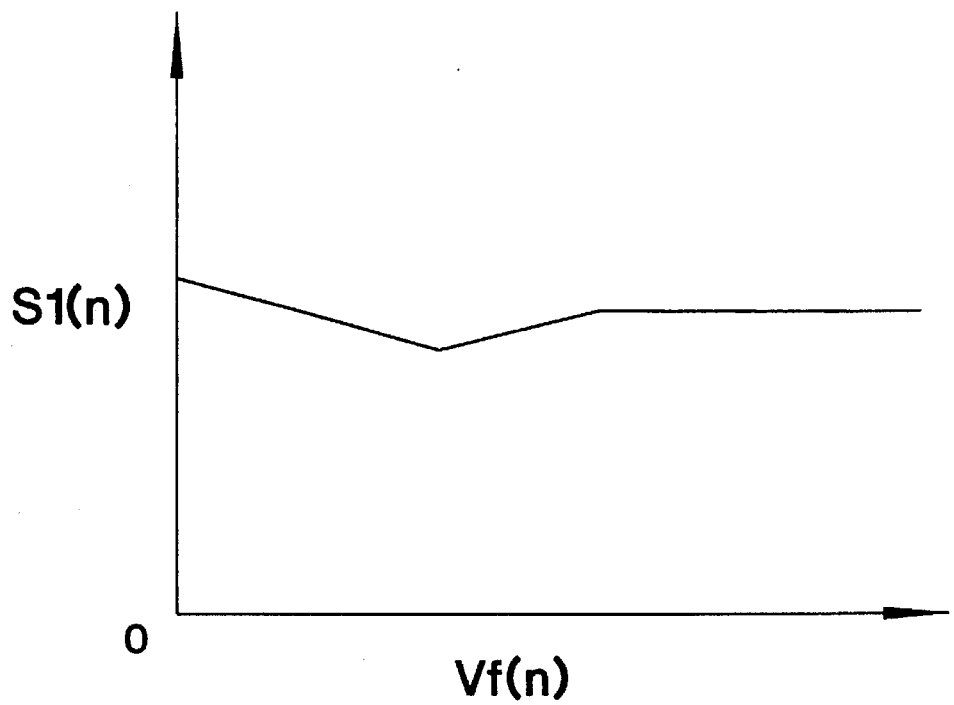
FIG. 20 is a graph for setting a control starting slip ratio $S_1(n)$.

An example of the process at step S15 described above is illustrated in FIG. 19. Referring to FIG. 19, first at step S101, it is determined whether or not the control inhibition flag $F_{contn}$ (refer to in steps S35 and S37 of FIG. 9) is equal to "0". If the control inhibition flag $F_{contn}$ is equal to "0", it is determined at step S102 whether or not the slip ratio $S_b(n)$ is higher than a control starting slip ratio $S_1(n)$. The ratio $S_1(n)$ is searched for from a graph or table as shown in FIG. 20 in response to the average front wheel velocity $V_f(n)$.

In case $S_b(n)$ is equal to or lower than $S_1(n)$, the process advances to step S16, but in case $S_b(n)$ exceeds $S_1(n)$, it is determined at step S103 whether or not the average rear wheel velocity $V_r(n)$ exceeds a predetermined velocity (for example, 5 km/h). In case $V_r(n)$ does not exceed the velocity just mentioned, the process advances to step S16, but in case $V_r(n)$ exceeds the velocity, it is determined at step S104 whether or not the average rear wheel velocity $V_r(n)$ exceeds an average rear wheel velocity $V_r(n-1)$ calculated in the last control cycle.

In case $V_r(n)$ is lower than $V_r(n-1)$, the process advances to step S16, but in case $V_r(n)$ exceeds $V_r(n-1)$, it is determined at step S105 whether or not the average front wheel velocity $V_f(n)$ is equal to or lower than a predetermined velocity (for example, 3 km/h).

In case $V_f(n)$ exceeds the velocity mentioned just above (when the vehicle is running), it is determined at step S106 whether or not the front wheel fail flag $F_{fsf}$ is equal to "1". If it is equal to "1", the process advances to step S16. If the front wheel fail flag $F_{fsf}$ is equal to "0", it is determined that the starting conditions for driving force control are satisfied and the process advances to step S18, at which $C\theta_{ig}(n)$ is adopted as $\theta_{ig}(n)$.

In case $V_f(n)$ is equal to or lower than the velocity mentioned above, it is determined at step S107 whether or not the transmission of the vehicle is at a neutral position. If the transmission is at the neutral position, the process advances to step S16, but if the transmission is not at the neutral position, the process advances to step S18.

If the determination at steps S102 to S104 are all affirmative and the determination at step S105 is negative, conventionally it is determined that the starting conditions for driving force control are satisfied. But, in the present embodiment, it is further determined at step S106 whether or not the front wheel fail flag $F_{fsf}$ is equal to "1", and only when the front wheel fail flag $F_{fsf}$ is equal to "0", driving force control will be entered.

In particular, since this is the case where the process advances to step S106 by way of steps S102 to S105 even when the front wheel sensor 7 is in a failed condition, it is determined that there is the possibility that the front wheel sensor 7 may be in failure (when $F_{fsf}$ is equal to "1"), and a driving force control will not be entered.

It is to be noted that the value of the average front wheel velocity $V_f(n)$ does not vary to a great extent immediately even if the front wheel sensor 7 fails so that the output of the front wheel sensor 7 is reduced, for example, to 0. Accordingly, even if it is determined at step S105 that the average front wheel velocity $V_f(n)$ exceeds the predetermined velocity mentioned above, there is the possibility that $F_{fsf}$ may be equal to "1".

Referring back to FIG. 8, when it is determined at step S14 that driving force control is being executed, it is determined at step S17 whether or not ending conditions for driving force control are satisfied. If the ending conditions are not satisfied, the process advances to step S18 described above. If the ending conditions are satisfied, the process advances to step S21 to enter returning control in which $C\theta_{ig}$ is returned gradually to $S\theta_{ig}(n)$.

Figure 21:
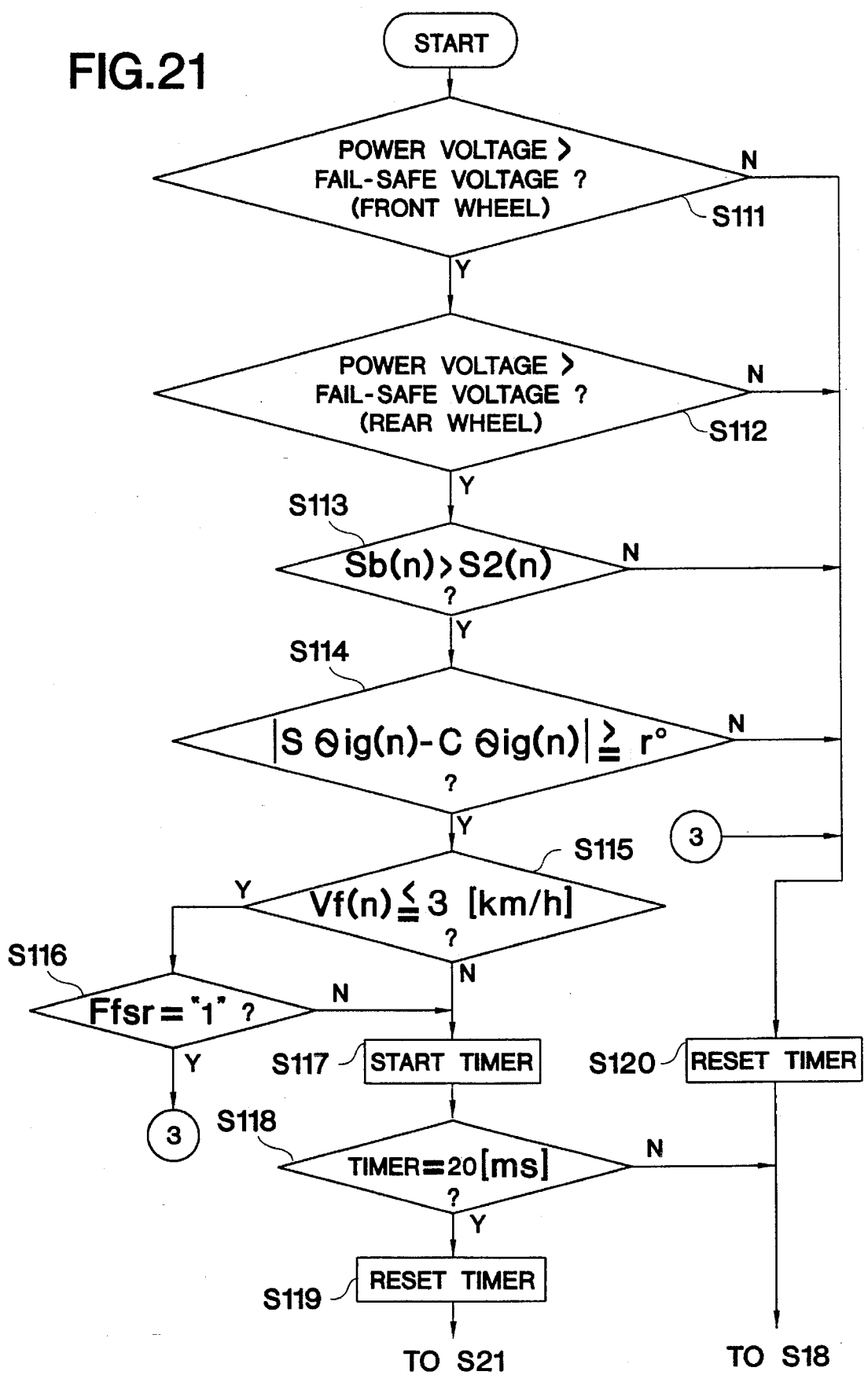
FIG. 21 is a subroutine showing an example of the process at step S17.

An example of the process at step S17 described above is shown in FIG. 21. Referring to FIG. 21, first at steps S111 and S112, it is determined whether or not the power source voltage for the front wheel sensor 7 and the power source voltage for the rear wheel sensor 12 exceed the fail-safe voltage. If at least one of the power source voltages is equal to or lower than the fail-safe voltage, the process advances to step S120. On the other hand, if the power source voltages both exceed the fail-safe voltage, the process advances to step S113.

Figure 22:
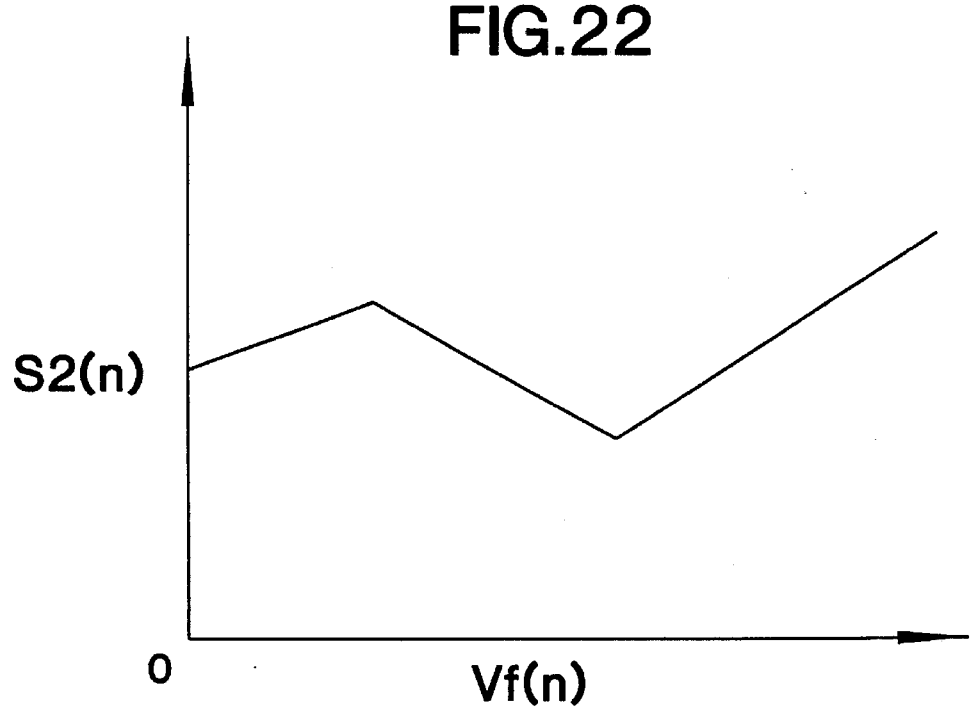
FIG. 22 is a graph for setting a control ending slip ratio $S_2(n)$.

At step S113, it is determined whether or not the slip ratio $S_b(n)$ is lower than a control ending slip ratio $S_2(n)$. Such slip ratio $S_2(n)$ is searched for from a graph or table as shown, for example, in FIG. 22 in accordance with the average front wheel velocity $V_f(n)$.

In case $S_b(n)$ is equal to or higher than $S_2(n)$, the process advances to step S120, but in case $S_b(n)$ is lower than $S_2(n)$, it is determined at step S114 whether or not an absolute value of a difference between $S\theta_{ig}(n)$ and $C\theta_{ig}(n)$ is equal to or higher than a predetermined angle r degrees. If the absolute value is lower than r degrees, the process advances to step S120, but if the absolute value is equal to or higher than r degrees, it is determined at step S115 whether or not the average front wheel velocity $V_f(n)$ is equal to or lower than a predetermined velocity (for example, 3 km/h].

If $V_f(n)$ is equal to or lower than the velocity mentioned just above, it is determined at step S116 whether or not the rear wheel fail flag $F_{fsf}$ is equal to "1". If the flag $F_{fsf}$ is equal to "1", the process advances to step S120. In case the flag $F_{fsf}$ is equal to "0" or in case it is determined at step S115 that $V_f(n)$ exceeds the predetermined velocity mentioned above, a timer is started at step S117. It is to be noted that, in case the processing is passed in a subsequent control cycle or cycles, the measured time of the timer is not reset.

At step S118, it is determined whether or not the timer described above has measured a predetermined time (for example, 20 ms). If the predetermined time just mentioned has elapsed, the timer is reset at step S119, and, the process advances to step S21 (FIG. 8). In other words, it is determined that the ending conditions for driving force control are satisfied, and returning control is entered.

In case the predetermined time has not elapsed or after the timer described above is reset at step S120, the process advances to step S18 (FIG. 8). In other words, it is determined that the ending conditions for driving force control are not satisfied, and $C\theta_{ig}(n)$ is adopted as $\theta_{ig}(n)$.

Figure 23:
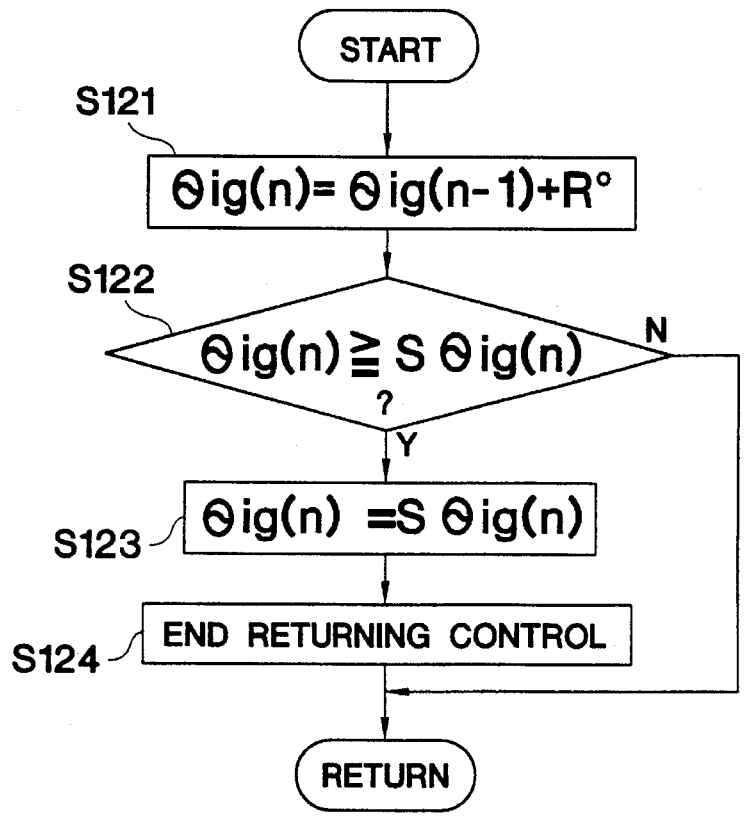
FIG. 23 is a subroutine showing an example of the process at step S21.

Subsequently, an example of returning control at step S21 described above is illustrated in FIG. 23. Referring to FIG. 23, first at step S121, the ignition time $\theta_{ig}(n)$ is set to a value obtained by addition of a predetermined value R to an ignition time $\theta_{ig}(n-1)$ calculated in the last control cycle. In other words, $\theta_{ig}(n)$ is set to a value led by R degrees from $\theta_{ig}(n-1)$.

At step S122, it is determined whether or not $\theta_{ig}(n)$ is a value equal to higher than the standard ignition time $S\theta_{ig}(n)$ calculated at step S12, that is, whether or not $\theta_{ig}(n)$ is a value equal to $S\theta_{ig}(n)$ or leads from $S\theta_{ig}(n)$. If $\theta_{ig}(n)$ is a value equal to or higher than $S\theta_{ig}(n)$, the ignition time $\theta_{ig}(n)$ is set to $S\theta_{ig}(n)$ at step S123, and ending of the returning control is determined at step S124, whereafter the process comes to an end. On the other hand, if $\theta_{ig}(n)$ is a value lower then $S\theta_{ig}(n)$, the process comes to an end as it is in order to continue the returning control.

It is to be noted that, while the processing at step S121 in the present example is executed for each execution of the main routine, it may be executed for each fixed timing independent of an execution timing of the routine.

Referring back to FIG. 8, in case it is determined at step S13 described above that returning control is being executed, it is determined at step S20 whether or not conditions for ending of the returning control and returning to driving force control are satisfied. The determination can be executed particularly by determining whether or not the slip ratio $S_b(n)$ calculated at step S8 is higher than the control starting slip ratio $S_1(n)$ (refer to step S102 of FIG. 19). If $S_1(n)$ is exceeded, the process advances from step S20 to step S18, but if $S_1(n)$ is not exceeded, the process advances to step S21 in order to continue the returning control.

Figure 24:
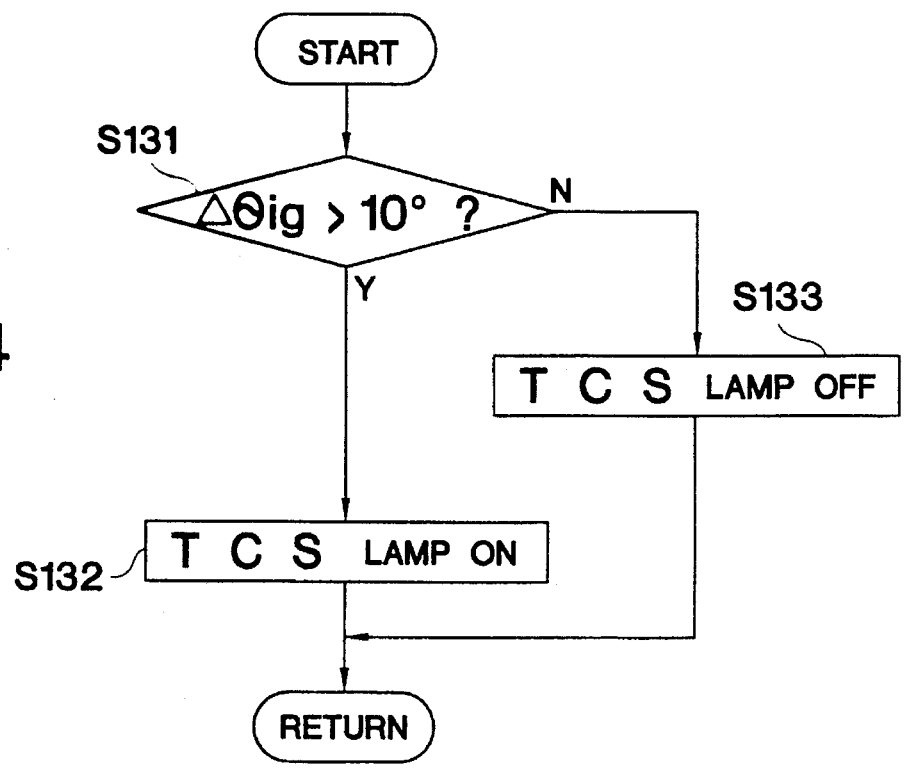
FIG. 24 is a subroutine showing an example of the process at step S19.

Subsequently, when $C\theta_{ig}(n)$ is adopted as $\theta_{ig}(n)$ at step S18, lighting control of the TCS operation lamp 2 is executed at step S19. An example of the process is illustrated in FIG. 24. Referring to FIG. 24, first at step S131, it is determined whether or not the retard amount $\Delta\theta_{ig}$ used in the calculation of $C\theta_{ig}(n)$ exceeds a predetermined angle (for example, 10 degrees). The predetermined angle just mentioned is a value such that when the ignition time is retarded, for example, by the angle, the driver of the vehicle can feel that driving force control is being executed.

If the angle mentioned above is exceeded, the TCS operation lamp 2 is turned ON at step S132, but if the angle is not exceeded, then the TCS operation lamp 2 is turned OFF at step S133. After then, the process comes to an end. In short, in the present embodiment, even if driving force control is being executed actually, the TCS operation lamp 2 is lit only when the controlling condition can be felt by the driver.

The process at steps S1 and S21 illustrated in FIGS. 7 and 8, that is, the calculation of an ignition time $\theta_{ig}(n)$, can be executed by the first CPU 4A for driving force control of the ignition/driving force control unit 4 (FIG. 2). And, $\theta_{ig}(n)$ is transferred to the second CPU 4B for ignition. The second CPU 4B controls the ignition plugs 8 (FIG. 2) using such $\theta_{ig}(n)$. Further, the second CPU 4B independently calculates a backup standard ignition time $S\theta_{ig}(n)$ and controls, when the driving force controlling system or the first CPU 4A fails, the ignition plugs 8 using such $S\theta_{ig}(n)$.

Such control of the second CPU 4B is executed at step S22. An outline of the step S22 is as follows:

1) Control of the ignition plugs 8 in accordance with an ignition time $\theta_{ig}(n)$ transmitted thereto from the first CPU 4A;
2) Calculation of a backup standard ignition time $S\theta_{ig}(n)$;
3) Calculation of an energization time of the ignition plugs 8;
4) Outputting of engine speed data to the tachometer;
5) Outputting of a fixed point upon starting; and
6) Calculation of an explosion completion signal (outputting to the ABS controlling unit 55).

Now, an example of the failure determination described in connection with the step S32 of FIG. 9 is described subsequently. A failure is determined when any one of conditions (1) to (8) is satisfied. Such failure determination is executed by the first CPU 4A or the second CPU 4B. The following are the eight conditions.

(1) After the power source voltage for the front wheel sensor 7 becomes lower than the fail-safe voltage, the condition continues for a predetermined time $V_{wbf}$, or after the power source for the rear wheel sensor 12 becomes lower than the fail-safe voltage, the condition continues for the predetermined time $V_{wbr}$.

(2) After the front wheel fail flag $F_{fsf}$ indicated at step S43 of FIG. 10 becomes equal to "1", the condition continues for a predetermined time $V_n$ (for example, 1.5 sec.), or after the rear wheel fail flag $F_{fsr}$ becomes equal to "1", the condition continues for the predetermined time $V_n$.

(3) The average rear wheel velocity $V_r(n)$ does not exceed a predetermined wheel velocity $V_{rmin2}$ (for example, 3 km/h) within a predetermined time $V_{f2}$ (for example, 500 ms) or after the average front wheel velocity $V_f(n)$ has exceeded a predetermined wheel velocity $V_{fmin}$ (for example, 4 km/h).

(4) The average front wheel velocity $V_f(n)$ does not exceed the predetermined wheel velocity $V_{fmin2}$ (for example, 3 km/h) within another predetermined time $V_{f3}$ (for example, 10 sec) or after the average rear wheel velocity $V_r(n)$ has exceeded the predetermined wheel velocity $V_{rmin}$ (for example, 4 km/h).

(5) No signal comes from the second CPU 4B (determined by the first CPU 4A).

(6) No signal comes from the first CPU 4A (determined by the second CPU 4B).

(7) An abnormality of communication data is detected by the first CPU 4A or the second CPU 4B.

(8) While the engine speed $N_e$ calculated by the second CPU 4B is equal to or higher than a predetermined speed (for example, 600 rpm), $N_e$ calculated by the first CPU 4A is lower than the speed just mentioned and this condition continues for a predetermined time $N_{ef}$.

It is to be noted that the conditions (1) and (5) to (8) described above are monitored also as initial diagnosis upon starting of the system. Further, if a failure is determined in accordance with the technique described above, the ignition time will be controlled in response to a controlling condition at the point of time of detection of the failure. In particular, if driving force control is being executed, the ignition time is gradually returned to the standard ignition time after detection of the failure. On the other hand, in the case of a standard controlling condition, even if driving force control is instructed after the detection of the failure, the control is inhibited and the standard controlling condition is continued.

Figure 1:
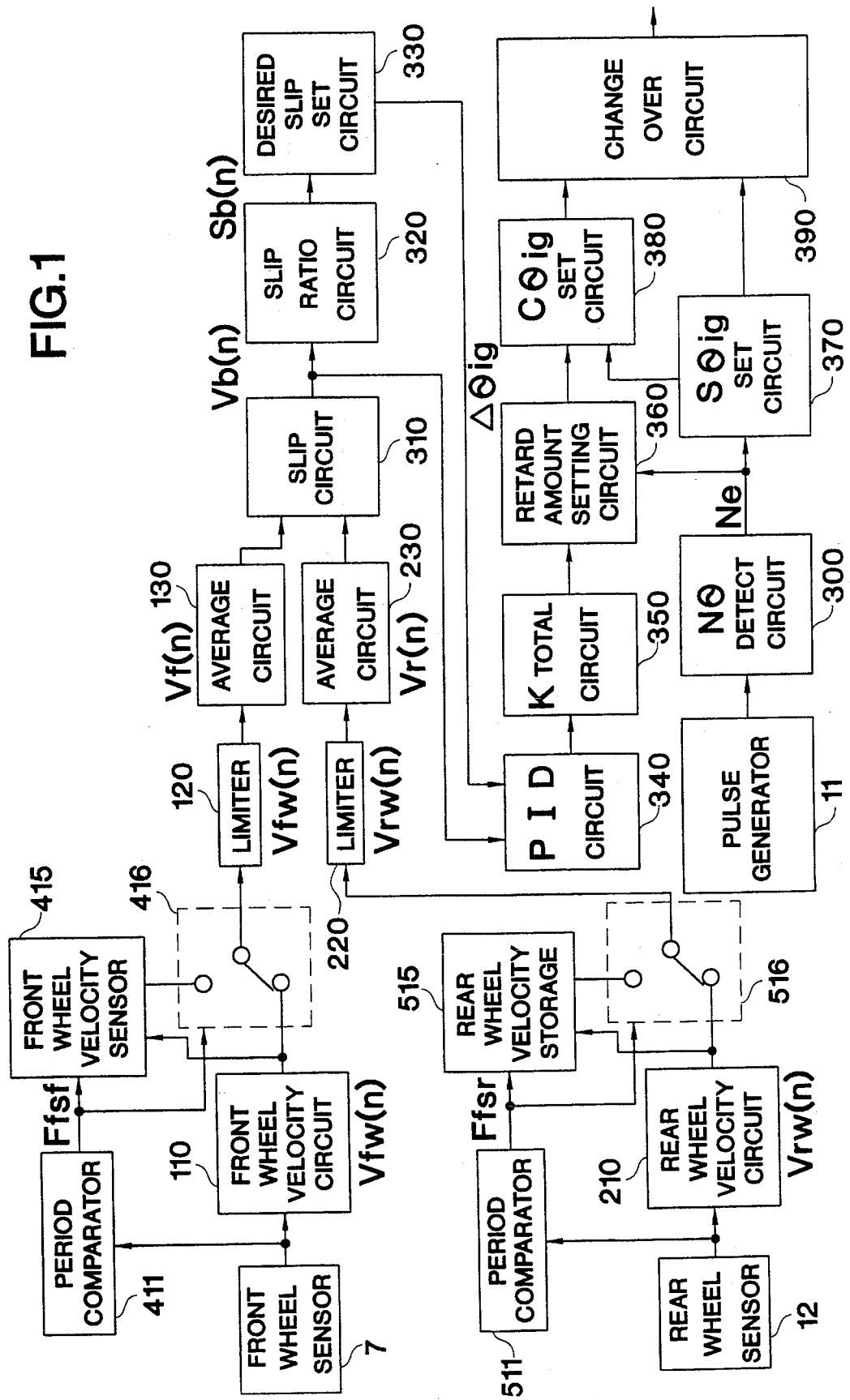
FIG. 1 is a function block diagram of one embodiment of the present invention.

By the way, a function block diagram of an embodiment of the present invention is shown in FIG. 1. Referring to FIG. 1, like reference numerals to those of FIG. 2 denote like or equivalent portions. It is to be noted that, in FIG. 1, the failure determination process described above is omitted. Referring to FIG. 1, front wheel velocity calculator means 110 calculates a front wheel velocity $V_{fw}(n)$ using pulses outputted from the front wheel sensor 7, and front wheel velocity variation limiter 120 limits a variation amount of $V_{fw}(n)$, which is outputted through by way of the change over circuit, as indicated at step S5. The average front wheel velocity calculator 130 calculates an average front wheel velocity $V_f(n)$ using the third equation. The change over circuit 416 described above normally selects the front wheel velocity calculator 110.

Period comparator 411 determines, as shown at step S41 of FIG. 10, whether or not the output pulse period $T_f$ of the front wheel sensor 7 is equal to or lower than a predetermined period (for example, 20 ms). If $T_f$ exceeds the predetermined period described above, since there is the possibility that the front wheel sensor 7 may be in failure, the front wheel fail flag $F_{fsf}$ is set to "1" and the change over circuit 416 is energized to select front wheel velocity storage device 415.

Output data of the front wheel velocity calculator 110 are stored in the front wheel velocity storage circuit 415 described above, and at the point of time when the front wheel fail flag $F_{fsf}$ is changed to "1", a front wheel velocity for a predetermined number of control cycles before (a front wheel velocity $V_{fw}(n-9)$ for nine control cycles before at step S45 in FIG. 10, or generally a front wheel velocity $V_{fw}(n-m+1)$ for a number of control cycles before equal to a number obtained by subtraction of 1 from m which is a number of front wheel velocity data used for calculation of an average front wheel velocity $V_f(n)$ given by the equation 3) is outputted as a front wheel velocity $V_{fw}(n)$ of the present control cycle to the front wheel velocity variation limiter 120 by way of the change over circuit 416.

Also, on the rear wheel side, a rear wheel velocity $V_{rw}(n)$ is first calculated similarly by circuits 210, 220, 230, 511, 515, and 516, and when there is the possibility that the rear wheel sensor 12 may be in failure, a rear wheel velocity for the predetermined number of control cycles before is adopted as a rear wheel velocity $V_{rw}(n)$ of the present control cycle, and after the variation of the front wheel velocity $V_{fw}(n)$ is limited, an average rear wheel velocity $V_r(n)$ is calculated.

Slip amount calculator means 310 and slip ratio calculator 320 calculate a slip amount $V_b(n)$ and a slip ratio $S_b(n)$ of the vehicle, respectively. Further, a slip ratio circuit 330 sets slip amount $V_T$ from $S_b(n)$.

PID calculator 340 calculates a proportional term $T_p$, an integral term $T_i$ and a differential term $T_d$, which are PID feedback controlling terms, using the sixth to eighth equations. Further, $K_{total}$ calculator 350 calculates an accumulated value $K_{total}$ of the controlling terms.

Engine speed detector 300 detects an engine speed $N_e$ using pulses outputted from the pulse generator 11.

Retard amount setting circuit 360 sets a retard amount $\Delta\theta_{ig}$ using the engine speed $N_e$ and the accumulated value $K_{total}$. Further, $S\theta_{ig}$ setting circuit 370 sets a standard ignition time $S\theta_{ig}(n)$ using the engine speed $N_e$. Further $C\theta_{ig}$ settings circuit 380 sets a driving force controlling ignition time $C\theta_{ig}(n)$ in accordance with the tenth equation using $S\theta_{ig}(n)$ and $\Delta\theta_{ig}$ mentioned above.

Change over controller 390 selects one of $S\theta_{ig}(n)$ and $C\theta_{ig}(n)$ and outputs the same to the ignition coil 8.

It is to be noted that the front wheel velocity variation limiter 120 and the rear wheel velocity variation limiter 220 can be omitted. Further, while $T_f$ is set to $maxT_f$ at step S47 and a front wheel velocity $V_{fw}(n)$ is calculated again at step S48, at those steps, $V_{rw}(n-9)$ may be set to $V_{fw}(n)$ similarly as at step S45.

When the output pulse period of the front wheel sensor 7 is equal to or longer than the predetermined period, the front wheel velocity $V_{fw}(n-m+1)$ for a number of control cycles before equal to a number obtained by subtraction of 1 from m which is a number of front wheel velocity data used for calculation of an average front wheel velocity $V_f(n)$ given by the equation 3 is adopted as a front wheel velocity $V_{fw}(n)$ of the present control cycle, data other than $V_r(n-m+1)$ (for example, a front wheel velocity $V_{fw}(n-1)$ of the last control cycle, or $V_{fw}(n-m+2)$ or the like) may be adopted as the front wheel velocity $V_{fw}(n)$ of the present control cycle. This also applies to the rear wheel side.

Further, a process may be performed only for one of the front wheel side and the rear wheel side.

Further, the present invention may be applied, other than to ignition time control, to the type which controls driving force by controlling, for example, an air/fuel ratio.

Further, the present invention may be applied, for example, to an automobile or the like other than a motor-bicycle.

Figure 25:
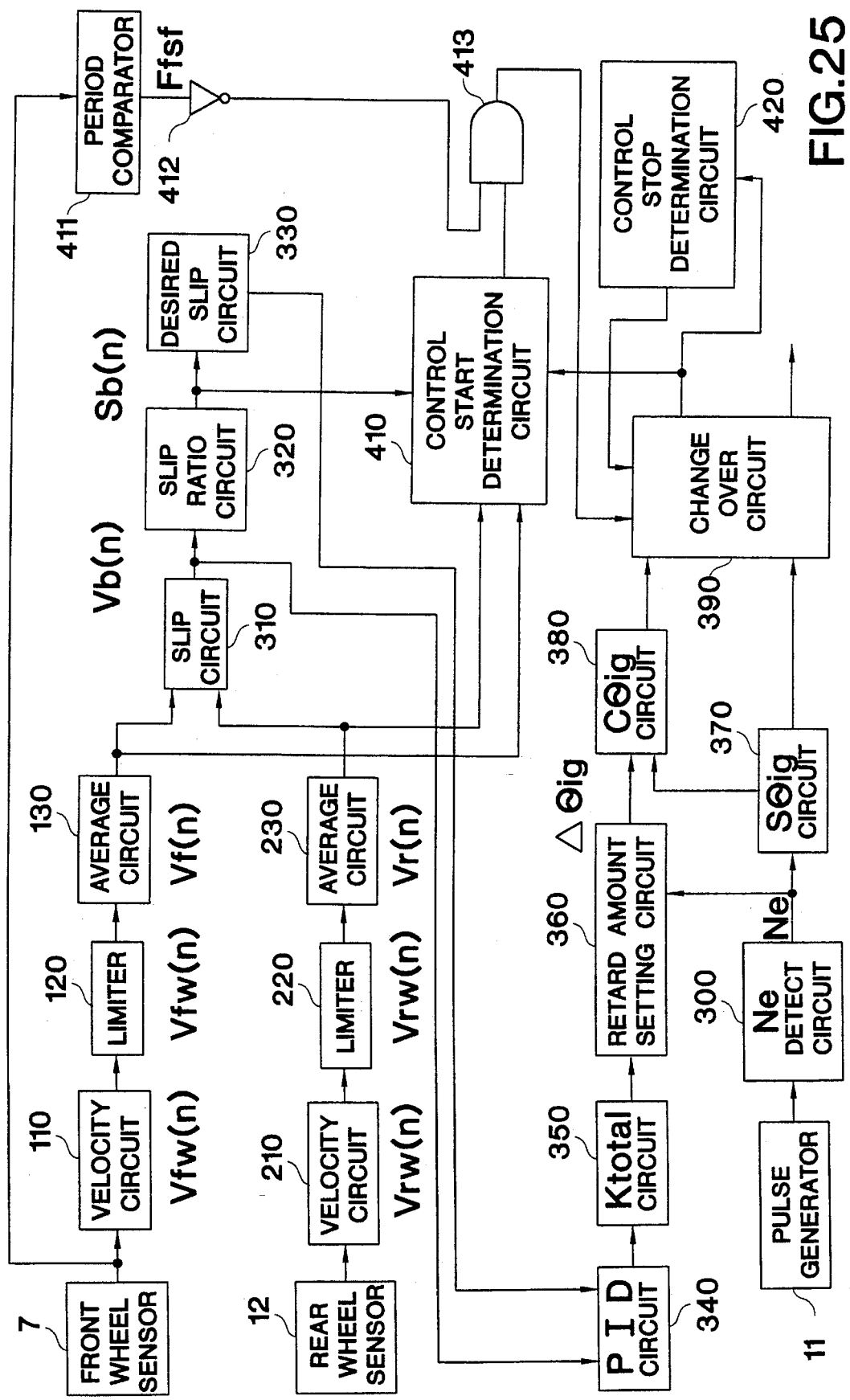
FIG. 25 is a function block diagram of one embodiment of the present invention.

By the way, a function block diagram of an embodiment of the present invention is shown in FIG. 25. Referring to FIG. 25, like reference numerals to those of FIG. 2 denote like or equivalent portions. It is to be noted that, in FIG. 25, the failure judging processing described above is omitted. Referring to FIG. 25, front wheel velocity calculator 110 calculates a front wheel velocity $V_{fw}(n)$ using pulses outputted from the front wheel sensor 7, and front wheel velocity variation limiter 120 limits a variation amount of $V_{fw}(n)$ as indicated at step S5. And, average front wheel velocity calculator 130 calculates an average front wheel velocity $V_f(n)$ using the third equation.

Also on the rear wheel side, a variation of a rear wheel velocity $V_{rw}(n)$ is limited and an average rear wheel velocity $V_r(n)$ is calculated by devices 210, 220 and 230.

Slip amount calculator 310 and slip ratio calculator 320 calculate a slip amount $V_b(n)$ and a slip ratio $S_b(n)$ of the vehicle, respectively. Further, slip ratio setting circuit 330 sets an aimed slip amount $V_T$ from $S_b(n)$.

PID calculator 340 calculates a proportional term $T_p$, an integral term $T_i$ and a differential term $T_d$, which are PID feedback controlling terms, using the sixth to eighth equations. Further, $K_{total}$ calculator 350 calculates an accumulated value $K_{total}$ of the controlling terms.

Engine speed detector 300 detects an engine speed $N_e$ using pulses outputted from the pulse generator 11.

Retard amount setting circuit 360 sets a retard amount $\Delta\theta_{ig}$ using the engine speed $N_e$ and the accumulated value $K_{total}$. Further, $S\theta_{ig}$ setting circuit 370 sets a standard ignition time $S\theta_{ig}$ using the engine speed $N_e$. Further $C\theta_{ig}$ settings circuit 380 sets a driving force controlling ignition time $C\theta_{ig}(n)$ in accordance with the tenth equation using $S\theta_{ig}(n)$ and $\Delta\theta_{ig}$ mentioned above.

Change over controller 390 notifies driving force control starting condition judging circuit 410 and driving force control ending condition judging circuit 420 which one of the standard ignition time $S\theta_{ig}(n)$ and the driving force controlling ignition time $C\theta_{ig}(n)$ is selected and outputted to the ignition coils 8 at present.

The driving force control starting condition judging circuit 410 is started when the change over controller 390 selects the standard ignition time $S\theta_{ig}(n)$, and executes a process as indicated at least at steps S102 to S105 of FIG. 19 (naturally the process at steps S101 and S107 may be added), thereby determining whether or not, when the vehicle is running, the starting conditions for driving force control are satisfied. In case the starting conditions are satisfied, that is, in case a negative determination is made at step S105 of FIG. 19, the driving force control starting condition judging circuit 410 outputs "1" to one of inputs of an AND gate 413.

Period comparator 411 determines whether or not the output pulse period $T_f$ of the front wheel sensor 7 is equal to or lower than a predetermined period (for example, 20 ms) as indicated at step S41 of FIG. 10. If the vehicle is running and $T_f$ exceeds 20 ms, since there is the possibility that the front wheel sensor 7 is in failure, the front wheel fail flag $F_{fsf}$ is set to "1". Accordingly, since the output of an inverter 412 becomes equal to "0" in this case, even if the driving force control starting condition judging circuit 410 detects the starting conditions for driving force control during running, the output of the AND gate 413 becomes equal to "0", and starting of driving force control is not instructed to the change over controller 390.

On the contrary in case the flag $F_{fsf}$ is equal to "0", that is when there is no possibility that the front wheel sensor 7 may be in failure, the output of the inverter 412 becomes equal to "1". Consequently, the judging circuit 410 detects the starting conditions for driving force control, the output of the AND gate 413 becomes equal to "1", and starting of driving force control is instructed to the change over controller 390 and the driving force controller ignition time $C\theta_{ig}(n)$ is selected as the ignition time $\theta_{ig}(n)$.

It is to be noted that the driving force control starting condition judging circuit 410 may determine the starting conditions for driving force control by executing processes other than that of FIG. 19.

Driving force control ending condition judging circuit 420 is started when the change over controller 390 selects the driving force controlling ignition time $C\theta_{ig}(n)$, and determines whether or not the ending conditions for driving force control are satisfied. In case the ending conditions are satisfied, ending of the driving force control is instructed to the change over controller 390 and the standard ignition time $S\theta_{ig}(n)$ is selected as the ignition time $\theta_{ig}(n)$.

While it is described, in the description on FIG. 19, that whether or not driving force control is to be started is finally determined, after a negative determination at step S105 (satisfaction of the starting conditions for driving force control), depending upon whether the front wheel fail flag $F_{fsf}$ is equal to "1" or "0", whether or not driving force control is to be started may be determined finally by judging, in place of use of or in addition to $F_{fsf}$, whether the rear wheel fail flag $F_{fsf}$ is equal to "1" or "0".

As apparent from the foregoing description, according to the present invention, the following effects can be achieved.

According to a driving force controlling apparatus for a vehicle, when the possibility of a failure of a sensor for detecting a wheel velocity is high (that is, for a period of time after the sensor fails actually until a microcomputer detects the failure), even if other starting conditions for driving force control are satisfied, starting of driving force control is inhibited.

According to a driving force controlling apparatus for a vehicle, starting conditions for driving force control can be determined with a comparatively simple construction without addition of hardware.

According to the present invention, when the possibility that a front wheel sensor or a rear wheel sensor may be in failure is high, an average value is calculated using wheel velocities before the failure until after a microcomputer actually makes a determination of a failure of the sensor, a great variation of the calculated wheel velocity is prevented and the wheel velocity does not vary greatly from an actual wheel velocity. Even before detection of a failure of the sensor, setting of an ignition time or the like for driving force control can be performed using wheel velocity data having no great variation.

While only certain embodiments of the present invention have been described, it will be apparent to those skilled in the art that various changes and modifications may be made therein without departing from the spirit and scope of the present invention as set forth in the claims below.

I claim:

1. An apparatus to prevent a great variation of a detected wheel velocity for a period of time after a front wheel sensor actually fails until a microcomputer detects the failure, comprising:

determining means for determining whether an output pulse period of the front wheel sensor is equal to or shorter than a predetermined period;

failure means for determining a failure when the output pulse period of the front wheel sensor exceeds the predetermined period; and velocity means for setting a front wheel velocity to a velocity equal to a velocity calculated a predetermined number of control cycles before the failure.

2. The apparatus as claimed in claim 1 wherein said predetermined number is nine.

3. An apparatus to prevent a great variation of a detected wheel velocity for a period of time after a rear wheel sensor actually fails until a microcomputer detects the failure, comprising:

determining means for determining whether an output pulse period of the rear wheel sensor is equal to or shorter than a predetermined period;

failure means for determining a failure when the output pulse period of the rear wheel sensor exceeds the predetermined period; and velocity means for setting a rear wheel velocity to a velocity equal to a velocity calculated a predetermined number of control cycles before the failure.

4. The apparatus as claimed in claim 3 wherein said determining means determines whether an output pulse period of a front wheel sensor is equal to or shorter than the predetermined period;

said failure means determining a failure when the outputted pulse period of the front wheel sensor exceeds the predetermined period; and said velocity means setting a front wheel velocity to a velocity equal to a velocity calculated a predetermined number of control cycles before failure.

5. The apparatus as claimed in claim 4 wherein said predetermined number is nine.

6. The apparatus as claimed in claim 3 wherein said predetermined number is nine.

7. A method for preventing a great variation of a detected wheel velocity for a period of time after a front wheel sensor actually fails until a microcomputer detects the failure, comprising the steps of:

(a) determining whether an output pulse period of the front wheel sensor is equal to or shorter than a predetermined period;

(b) determining a failure when the output pulse period of the front wheel sensor exceeds the predetermined period; and (c) setting a front wheel velocity to a velocity equal to a velocity calculated a predetermined number of control cycles before the failure.

8. The method as claimed in claim 7 wherein said predetermined number is nine.

9. A method for preventing a great variation of a detected wheel velocity for a period of time after a rear wheel sensor actually fails until a microcomputer detects the failure, comprising the steps of:

(a) determining whether an output pulse period of the rear wheel sensor is equal to or shorter than a predetermined period;

(b) determining a failure when the output pulse period of the rear wheel sensor exceeds the predetermined period; and (c) setting a rear wheel velocity to a velocity equal to a velocity calculated a predetermined number of control cycles before the failure.

10. The method as claimed in claim 8, further comprising the steps of:

(d) determining whether an output pulse period of a front wheel sensor is equal to or shorter than the predetermined period;

(e) determining a failure when the output pulse period of the front wheel sensor exceeds the predetermined period; and (f) setting a front wheel velocity to a velocity equal to a velocity calculated a predetermined number of control cycles before failure.

11. The method as claimed in claim 10 wherein said predetermined number is nine.

12. The method as claimed in claim 9 wherein said predetermined number is nine.

13. A driving force controlling apparatus for a vehicle, comprising:

wheel velocity calculating means for calculating a velocity of a driven wheel and a velocity of a driving wheel of the vehicle;

average wheel velocity calculating means for calculating an average driven wheel velocity and an average driving wheel velocity from the driven wheel velocity and the driving wheel velocity;

slip level detecting means for detecting a slip level of the vehicle from the average driven wheel velocity and the average driving wheel velocity;

retard amount setting means for setting a retard amount of an ignition time in response to the slip level;

driving force controlling ignition time setting means for setting an ignition time for driving force control using said retard amount;

period comparing means for determining whether a period of pulses outputted from at least one of the wheel velocity detecting sensors is equal to or lower than a predetermined period; and velocity means for supplying, when the period of the pulses is not equal to or lower than the predetermined period, a wheel velocity for a present control cycle which corresponds to a velocity calculated a predetermined number of control cycles before.

14. The apparatus as claimed in claim 13 wherein said predetermined number is nine.

15. A method for determining a velocity value for a driving force controlling apparatus for a vehicle, comprising the steps of:

(a) calculating a velocity of a driven wheel and a velocity of a driving wheel of the vehicle;

(b) calculating an average driven wheel velocity and an average driving wheel velocity from the driven wheel velocity and the driving wheel velocity;

(c) detecting a slip level of the vehicle from the average driven wheel velocity and the average driving wheel velocity;

(d) setting a retard amount of an ignition time in response to the slip level;

(e) setting an ignition time for driving force control using the retard amount;

(f) determining whether a period of pulses outputted from at least one of the wheel velocity detecting sensors is equal to or lower than a predetermined period; and (g) setting, when the period of the pulses is not equal to or lower than the predetermined period, a wheel velocity for a present control cycle to a velocity calculated a predetermined number of control cycles before.

16. The method as claimed in claim 15 wherein said predetermined number is nine.

17. A driving force controlling apparatus for a vehicle, comprising:

period comparing means for determining whether a period of pulses outputted from at least one of the wheel velocity detecting sensors is equal to or lower than a predetermined period; and velocity means for supplying, when the period of the pulses is not equal to or lower than the predetermined period, a wheel velocity for a present control cycle which corresponds to a velocity calculated a predetermined number of control cycles before.

18. The apparatus as claimed in claim 17 wherein said predetermined number is nine.

19. A method for determining a velocity value for a driving force controlling apparatus for a vehicle, comprising the steps of:

(f) determining whether a period of pulses outputted from at least one of the wheel velocity detecting sensors is equal to or lower than a predetermined period; and (g) setting, when the period of the pulses is not equal to or lower than the predetermined period, a wheel velocity for a present control cycle to a velocity calculated a predetermined number of control cycles before.

20. The method as claimed in claim 19 wherein said predetermined number is nine.

* * * * *